United States Patent
Humphrey et al.

(10) Patent No.: US 11,457,030 B2
(45) Date of Patent: Sep. 27, 2022

(54) ARTIFICIAL INTELLIGENCE RESEARCHER ASSISTANT FOR CYBERSECURITY ANALYSIS

(71) Applicant: Darktrace Limited, Cambridge (GB)

(72) Inventors: Dickon Humphrey, Cambridge (GB); David Palmer, Cheltenham (GB)

(73) Assignee: Darktrace Holdings Limited, Cambridge (GB)

( * ) Notice: Subject to any disclaimer, the term of this patent is extended or adjusted under 35 U.S.C. 154(b) by 763 days.

(21) Appl. No.: 16/278,957

(22) Filed: Feb. 19, 2019

(65) Prior Publication Data

US 2019/0260782 A1     Aug. 22, 2019

Related U.S. Application Data

(60) Provisional application No. 62/632,623, filed on Feb. 20, 2018.

(51) Int. Cl.
*H04L 9/40*     (2022.01)
*G06N 20/10*    (2019.01)
(Continued)

(52) U.S. Cl.
CPC ........ *H04L 63/1425* (2013.01); *G06F 3/0486* (2013.01); *G06F 3/04842* (2013.01);
(Continued)

(58) Field of Classification Search
CPC ............. H04L 63/1425; H04L 63/0209; H04L 63/0428; H04L 63/101; H04L 63/14;
(Continued)

(56) References Cited

U.S. PATENT DOCUMENTS 6,154,844 A    11/2000   Touboul et al.
6,965,968 B1   11/2005   Touboul
(Continued)

FOREIGN PATENT DOCUMENTS

EP    2922268 A1     9/2015
WO    2001031420 A2  5/2001
(Continued)

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.
(Continued)

*Primary Examiner* — Kambiz Zand
*Assistant Examiner* — Mahabub S Ahmed
(74) *Attorney, Agent, or Firm* — Rutan and Tucker, LLP

(57) ABSTRACT

A cyber threat defense system can autonomously gather research data about external hosts visited by a network entity and present that information in a format integrated with a threat-tracking graphical user interface. A collation module can collect input data from the network entity. A cyber threat module can identify a cyber threat from the input data. A host module can determine at least one host metric for an external host in the input data based on the identified cyber threat. A researcher module can collect host research data describing the external host. A scoring module can analyze the host research data using the at least one host metric. The scoring module can generate an automatic threat score describing a threat level presented by the external host. A user interface module can present a threat-tracking graphical user interface displaying the automatic threat score.

18 Claims, 20 Drawing Sheets

(51) Int. Cl.
| | |
|---|---|
| *G06F 21/55* | (2013.01) |
| *G06F 40/40* | (2020.01) |
| *G06N 20/00* | (2019.01) |
| *G06N 20/20* | (2019.01) |
| *G06F 21/36* | (2013.01) |
| *H04L 43/045* | (2022.01) |
| *G06F 16/2455* | (2019.01) |
| *G06F 3/04842* | (2022.01) |
| *G06F 3/0486* | (2013.01) |
| *H04L 41/22* | (2022.01) |
| *G06K 9/62* | (2022.01) |
| *G06V 30/10* | (2022.01) |
| *H04L 51/42* | (2022.01) |
| *H04L 51/212* | (2022.01) |
| *H04L 51/224* | (2022.01) |

(52) U.S. Cl.
CPC .......... *G06F 16/2455* (2019.01); *G06F 21/36* (2013.01); *G06F 21/554* (2013.01); *G06F 21/556* (2013.01); *G06F 40/40* (2020.01); *G06K 9/622* (2013.01); *G06K 9/6218* (2013.01); *G06N 20/00* (2019.01); *G06N 20/10* (2019.01); *G06N 20/20* (2019.01); *G06V 30/10* (2022.01); *H04L 41/22* (2013.01); *H04L 43/045* (2013.01); *H04L 51/212* (2022.05); *H04L 51/224* (2022.05); *H04L 51/42* (2022.05); *H04L 63/0209* (2013.01); *H04L 63/0428* (2013.01); *H04L 63/101* (2013.01); *H04L 63/14* (2013.01); *H04L 63/1416* (2013.01); *H04L 63/1433* (2013.01); *H04L 63/1441* (2013.01); *H04L 63/1483* (2013.01); *H04L 63/20* (2013.01)

(58) Field of Classification Search
CPC ............. H04L 63/1416; H04L 63/1433; H04L 63/1441; H04L 63/20; H04L 41/22; H04L 43/045; H04L 51/12; H04L 51/22; G06N 20/20; G06N 20/00; G06N 20/10; G06N 5/04; G06F 16/2455; G06F 40/40; G06F 3/04842; G06F 3/0486; G06F 21/36; G06F 21/554; G06F 21/556; G06K 9/6218; G06K 9/622
USPC .......................................................... 726/23
See application file for complete search history.

(56) References Cited

U.S. PATENT DOCUMENTS

| | | | |
|---|---|---|---|
| 7,307,999 B1 | 12/2007 | Donaghey | |
| 7,418,731 B2 | 8/2008 | Touboul | |
| 7,448,084 B1 | 11/2008 | Apap et al. | |
| 8,312,540 B1 | 11/2012 | Kahn et al. | |
| 8,819,803 B1 | 8/2014 | Richards et al. | |
| 8,879,803 B2 | 11/2014 | Ukil et al. | |
| 8,966,036 B1 | 2/2015 | Asgekar et al. | |
| 9,043,905 B1 | 5/2015 | Allen et al. | |
| 9,106,687 B1 | 8/2015 | Sawhney et al. | |
| 9,185,095 B1 | 11/2015 | Moritz et al. | |
| 9,213,990 B2 | 12/2015 | Adjaoute | |
| 9,401,925 B1 | 7/2016 | Guo et al. | |
| 9,516,039 B1 | 12/2016 | Yen et al. | |
| 9,516,053 B1 * | 12/2016 | Muddu ................... H04L 43/00 | |
| 9,641,544 B1 * | 5/2017 | Treat ....................... H04L 43/04 | |
| 9,712,548 B2 | 7/2017 | Shmuel et al. | |
| 9,727,723 B1 | 8/2017 | Kondaveeti et al. | |
| 9,736,147 B1 * | 8/2017 | Mead ..................... G06F 21/31 | |
| 9,754,106 B2 * | 9/2017 | Roundy ................ G06F 21/554 | |
| 9,965,937 B2 * | 5/2018 | Cohen ................... G06F 3/04842 | |
| 10,193,901 B2 * | 1/2019 | Muddu .................. H04L 63/1408 | |
| 10,594,714 B2 * | 3/2020 | Crabtree ................. H04L 63/20 | |
| 10,778,702 B1 * | 9/2020 | Huang ................. H04L 63/0236 | |
| 11,089,045 B2 * | 8/2021 | Crabtree ................. H04L 63/20 | |
| 2002/0186698 A1 | 12/2002 | Ceniza | |
| 2003/0070003 A1 | 4/2003 | Chong et al. | |
| 2003/0084349 A1 * | 5/2003 | Friedrichs ............... G06F 21/55 | 726/22 |
| 2004/0083129 A1 | 4/2004 | Herz | |
| 2004/0167893 A1 | 8/2004 | Matsunaga et al. | |
| 2005/0015624 A1 * | 1/2005 | Ginter ................... H04L 63/145 | 726/4 |
| 2005/0065754 A1 | 3/2005 | Schaf et al. | |
| 2006/0190419 A1 * | 8/2006 | Bunn ..................... G06V 20/52 | 706/2 |
| 2007/0118909 A1 | 5/2007 | Hertzog et al. | |
| 2007/0209075 A1 * | 9/2007 | Coffman ................. H04L 63/14 | 709/224 |
| 2007/0226796 A1 * | 9/2007 | Gilbert ................... G06F 21/577 | 726/25 |
| 2007/0261112 A1 * | 11/2007 | Todd ................... H04L 63/1483 | 726/2 |
| 2007/0294187 A1 | 12/2007 | Scherrer | |
| 2008/0005137 A1 | 1/2008 | Surendran et al. | |
| 2008/0109730 A1 | 5/2008 | Coffman et al. | |
| 2008/0229415 A1 * | 9/2008 | Kapoor ................... H04L 63/14 | 726/22 |
| 2009/0106174 A1 | 4/2009 | Battisha et al. | |
| 2009/0254971 A1 | 10/2009 | Herz et al. | |
| 2010/0009357 A1 | 1/2010 | Nevins et al. | |
| 2010/0095374 A1 | 4/2010 | Gillum et al. | |
| 2010/0125908 A1 | 5/2010 | Kudo | |
| 2010/0235908 A1 | 9/2010 | Eynon et al. | |
| 2010/0299292 A1 | 11/2010 | Collazo | |
| 2011/0093428 A1 | 4/2011 | Wisse | |
| 2011/0213742 A1 | 9/2011 | Lemmond et al. | |
| 2011/0261710 A1 | 10/2011 | Chen et al. | |
| 2012/0096549 A1 * | 4/2012 | Amini .................. H04L 63/1433 | 726/23 |
| 2012/0137367 A1 | 5/2012 | Dupont et al. | |
| 2012/0209575 A1 | 8/2012 | Barbat et al. | |
| 2012/0210388 A1 | 8/2012 | Kolishchak | |
| 2012/0284791 A1 | 11/2012 | Miller et al. | |
| 2012/0304288 A1 | 11/2012 | Wright et al. | |
| 2013/0091539 A1 | 4/2013 | Khurana et al. | |
| 2013/0198119 A1 | 8/2013 | Eberhardt, III et al. | |
| 2013/0198840 A1 | 8/2013 | Drissi et al. | |
| 2013/0254885 A1 | 9/2013 | Devost | |
| 2014/0007237 A1 | 1/2014 | Wright et al. | |
| 2014/0074762 A1 | 3/2014 | Campbell | |
| 2014/0165207 A1 * | 6/2014 | Engel .................... G06F 21/566 | 726/25 |
| 2014/0201836 A1 * | 7/2014 | Amsler ................... H04L 63/20 | 726/23 |
| 2014/0215618 A1 | 7/2014 | Amit | |
| 2014/0325643 A1 | 10/2014 | Bart et al. | |
| 2015/0067835 A1 | 3/2015 | Chari et al. | |
| 2015/0081431 A1 | 3/2015 | Akahoshi et al. | |
| 2015/0161394 A1 | 6/2015 | Ferragut et al. | |
| 2015/0163121 A1 * | 6/2015 | Mahaffey .............. G06F 11/3466 | 707/687 |
| 2015/0172300 A1 * | 6/2015 | Coch ..................... G06F 21/6218 | 726/23 |
| 2015/0180893 A1 | 6/2015 | Im et al. | |
| 2015/0188949 A1 * | 7/2015 | Mahaffey ................ H04W 12/37 | 726/1 |
| 2015/0213358 A1 | 7/2015 | Shelton et al. | |
| 2015/0286819 A1 | 10/2015 | Coden et al. | |
| 2015/0310195 A1 | 10/2015 | Bailor et al. | |
| 2015/0319185 A1 * | 11/2015 | Kirti ................... H04L 63/1416 | 726/23 |
| 2015/0341379 A1 * | 11/2015 | Lefebvre ............... H04L 63/1425 | 726/22 |
| 2015/0363699 A1 | 12/2015 | Nikovski | |
| 2015/0379110 A1 | 12/2015 | Marvasti et al. | |
| 2016/0062950 A1 | 3/2016 | Brodersen et al. | |
| 2016/0078365 A1 * | 3/2016 | Baumard ................. G06F 21/552 | 706/12 |
| 2016/0149941 A1 | 5/2016 | Thakur et al. | |

(56) References Cited

U.S. PATENT DOCUMENTS

| | | | |
|---|---|---|---|
| 2016/0164902 A1* | 6/2016 | Moore | H04L 63/1433 726/25 |
| 2016/0173509 A1 | 6/2016 | Ray et al. | |
| 2016/0182544 A1* | 6/2016 | Adjaoute | G06Q 30/0185 705/7.15 |
| 2016/0241576 A1 | 8/2016 | Rathod et al. | |
| 2016/0352768 A1 | 12/2016 | Lefebvre et al. | |
| 2016/0373476 A1 | 12/2016 | Dell'Anno et al. | |
| 2017/0063899 A1* | 3/2017 | Muddu | G06F 3/0482 |
| 2017/0063907 A1 | 3/2017 | Muddu et al. | |
| 2017/0063910 A1 | 3/2017 | Muddu et al. | |
| 2017/0063911 A1* | 3/2017 | Muddu | H04L 63/1433 |
| 2017/0063920 A1* | 3/2017 | Thomas | H04L 63/0272 |
| 2017/0169360 A1 | 6/2017 | Veeramachaneni et al. | |
| 2017/0171231 A1* | 6/2017 | Reybok, Jr | H04L 63/1416 |
| 2017/0220801 A1* | 8/2017 | Stockdale | H04L 63/1433 |
| 2017/0230391 A1 | 8/2017 | Ferguson et al. | |
| 2017/0230392 A1* | 8/2017 | Dean | H04L 63/1425 |
| 2017/0251012 A1 | 8/2017 | Stockdale et al. | |
| 2017/0270422 A1 | 9/2017 | Sorakado | |
| 2018/0027006 A1* | 1/2018 | Zimmermann | G06F 21/6218 726/11 |
| 2018/0157838 A1* | 6/2018 | Bushey | H04L 63/1483 |
| 2018/0159877 A1* | 6/2018 | Holzhauer | H04L 63/1416 |
| 2018/0159881 A1* | 6/2018 | Crabtree | H04L 63/1425 |
| 2018/0167402 A1* | 6/2018 | Scheidler | G06N 20/00 |
| 2018/0219894 A1* | 8/2018 | Crabtree | H04L 63/20 |
| 2018/0316701 A1* | 11/2018 | Holzhauer | H04L 63/1433 |
| 2019/0108334 A1* | 4/2019 | Sadaghiani | G06N 5/003 |
| 2020/0280568 A1* | 9/2020 | Bratspiess | H04L 63/1416 |
| 2021/0157312 A1* | 5/2021 | Celia | H04L 1/18 |
| 2021/0168175 A1* | 6/2021 | Crabtree | G06F 16/951 |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

OTHER PUBLICATIONS

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.

* cited by examiner

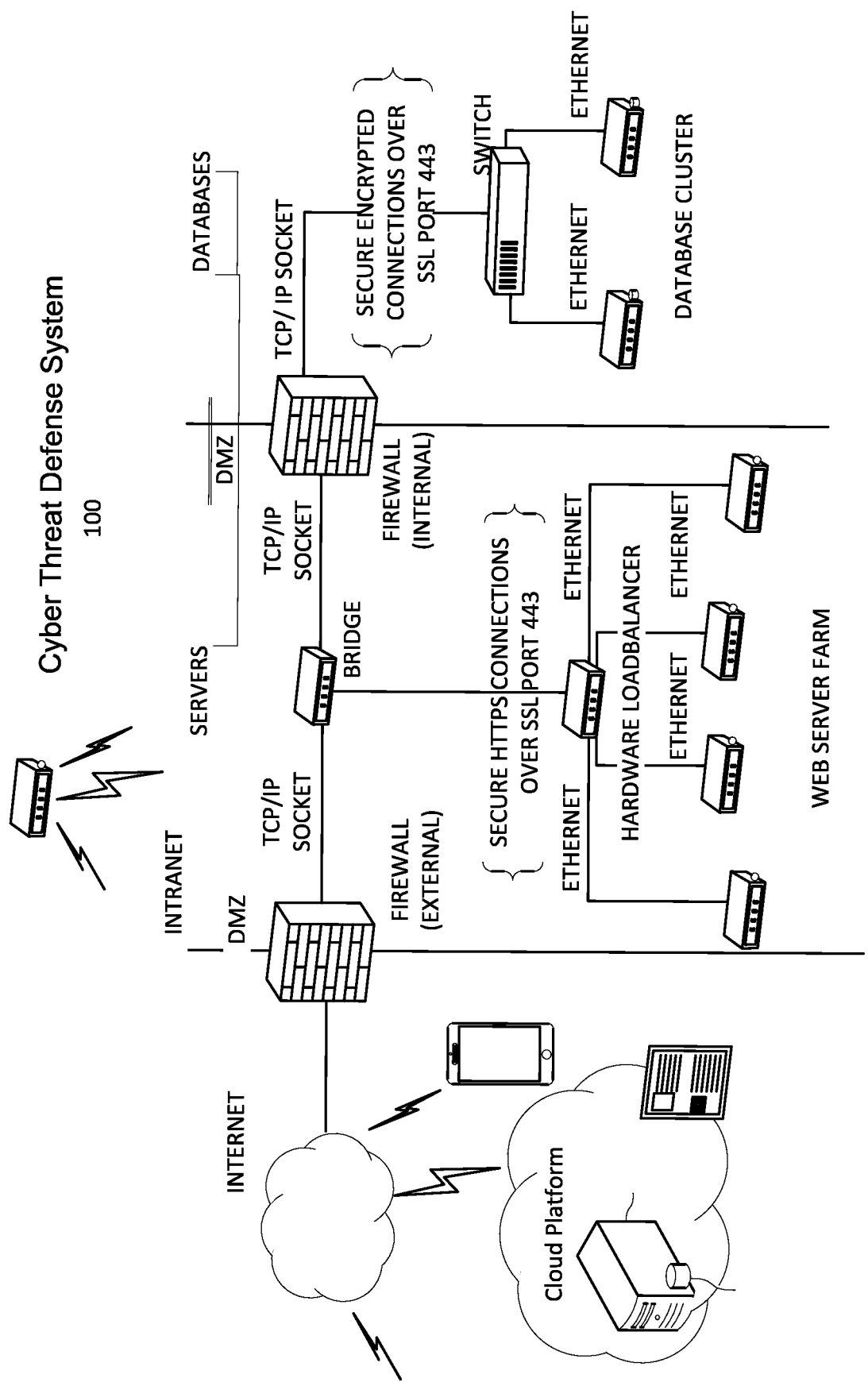
FIG. 20 Network

ARTIFICIAL INTELLIGENCE RESEARCHER ASSISTANT FOR CYBERSECURITY ANALYSIS

RELATED APPLICATION

This application claims priority to and the benefit of under 35 USC 119 of U.S. provisional patent application titled "A cyber threat defense system with various improvements," filed Feb. 20, 2018, Ser. No. 62/632,623, which is incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to a cyber threat defense system. In an embodiment, a cyber threat defense system may use autonomously gathered external research to determine whether an accessed host constitutes a malignant site.

BACKGROUND

In the cyber security environment, firewalls, endpoint security methods and other tools such as security information and event management systems (SIEMs) and restricted environments, such as sandboxes, are deployed to enforce specific policies and provide protection against certain threats. These tools currently form an important part of an organization's cyber defense strategy, but they are insufficient in the new age of cyber threat.

A cyber threat, including email threats, viruses, Trojan horses, and worms, can subtly and rapidly cause harm to a network. Additionally, human users may wreak further damage to the system by malicious action. A cyber security system has to identify each of these cyber threats as they evolve.

SUMMARY

A cyber threat defense system can autonomously gather research data about external hosts visited by a network entity and present that information in a format integrated with a threat-tracking graphical user interface. A collation module can collect input data from the network entity. A cyber threat module can identify a cyber threat from the input data. A host module can determine at least one host metric for an external host in the input data based on the identified cyber threat. A researcher module can collect host research data describing the external host. A scoring module can analyze the host research data using the at least one host metric. The scoring module can generate an automatic threat score describing a threat level presented by the external host. A user interface module can present a threat-tracking graphical user interface displaying the automatic threat score.

These and other features of the design provided herein can be better understood with reference to the drawings, description, and claims, all of which form the disclosure of this patent application.

DRAWINGS

The drawings refer to some embodiments of the design provided herein in which:

FIG. 20 illustrates a diagram of an embodiment of an example network to be protected by the cyber threat defense system.

Figure 1:
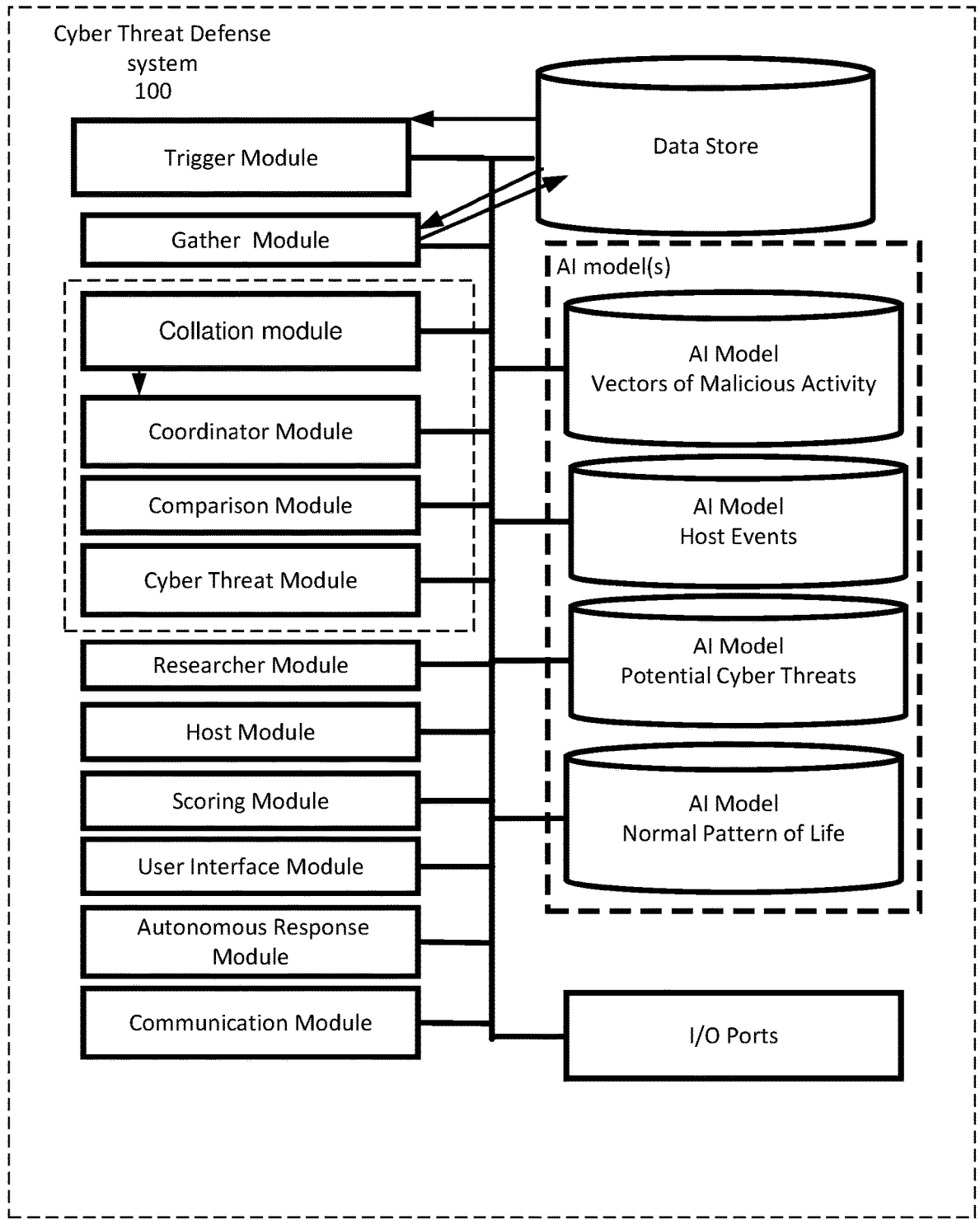
FIG. 1 illustrates a block diagram of an embodiment of a cyber threat defense system with a cyber threat module that references machine-learning models to identify cyber threats by identifying deviations from normal behavior.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, the cyber threat defense system may use artificial intelligence to analyze cyber security threats. In an aspect of this design, an autonomous analyst of the cyber threat defense system may use artificial intelligence to assist with mentorship/pre-emptive suggestions in various aspects such as the retrieval of simple details-based information from external sources (such as Domain Age) as well as internal sources, the retrieval of context information (such as security writeups for threats with similar hallmarks), a prediction of where the autonomous analyst suggests similar hostnames seen on the deployment, etc.

FIG. 1 illustrates a block diagram of an embodiment of a cyber threat defense system with a cyber threat module that references machine-learning models that are trained on the normal behavior of network activity and user activity associated with a network. The cyber threat module determines a threat risk parameter that factors in 'what is a likelihood of a chain of one or more unusual behaviors of email activity, network activity, and user activity under analysis that fall outside of being a normal benign behavior;' and thus, are likely malicious behavior.

The cyber threat defense system 100 may protect against cyber security threats from an e-mail system or other communication system, as well as its network. The cyber threat defense system 100 may include components such as i) a trigger module, ii) a gather module, iii) a data store, iv) a collation module, v) a coordinator module, vi) a comparison module, vii) a cyber threat module, viii) a researcher module, ix) a host module, x) a scoring module, xi) a user interface module, xii) an autonomous response module, xiii) a communication module, xiv) at least one input or output (I/O) port to securely connect to other ports as required, xv) one or more machine-learning models such as a first Artificial Intelligence model trained on characteristics of vectors for malicious activity and related data, a second Artificial Intelligence model trained on the characteristics of external hosts and the interaction of network entities with external hosts, a third Artificial Intelligence model trained on potential cyber threats, and one or more Artificial Intelligence models each trained on different users, devices, system activities and interactions between entities in the system, and other aspects of the system, as well as xiv) other similar components in the cyber threat defense system.

A trigger module may detect time stamped data indicating one or more i) events and/or ii) alerts from I) unusual or II) suspicious behavior/activity are occurring and then triggers that something unusual is happening. Accordingly, the gather module is triggered by specific events and/or alerts of i) an abnormal behavior, ii) a suspicious activity, and iii) any combination of both. The inline data may be gathered on the deployment from a data store when the traffic is observed. The scope and wide variation of data available in this location results in good quality data for analysis. The collected data is passed to the comparison module and the cyber threat module.

The gather module may comprise of multiple automatic data gatherers that each look at different aspects of the data depending on the particular hypothesis formed for the analyzed event and/or alert. The data relevant to each type of possible hypothesis will be autonomously pulled from additional external and internal sources. Some data is pulled or retrieved by the gather module for each possible hypothesis. A feedback loop of cooperation occurs between the gather module, the collation module monitoring network and email activity, the comparison module to apply one or more models trained on different aspects of this process, and the cyber threat module to identify cyber threats based on comparisons by the comparison module. While an email module is mentioned, a similar module may be applied to other communication systems, such as text messaging and other possible vectors for malicious activity. Each hypothesis of typical threats can have various supporting points of data and other metrics associated with that possible threat, such as a human user insider attack, inappropriate network behavior, or email behavior or malicious software or malware attack, inappropriate network behavior, or email behavior. A machine-learning algorithm will look at the relevant points of data to support or refute that particular hypothesis of what the suspicious activity or abnormal behavior related for each hypothesis on what the suspicious activity or abnormal behavior relates to. Networks have a wealth of data and metrics that may be collected. The gatherers may then filter or condense the mass of data down into the important or salient features of data. In an embodiment, the collation module and the coordinator module may be portions of the cyber threat module.

A collation module can be configured to collect a set of input data gathered by a cyber defense appliance situated within a network and an optional series of probes deployed to a set of distributed entities such as SaaS or Cloud environments throughout a network. The network entity represents at least one of a user and a network device interacting with the network. The probe data describes any activity executed by a network entity in a distributed network located and administrated by a network administrator and associated with a first network such as a third-party Cloud or SaaS environment. A distributed network may be made up of one or more combinations of devices, sub-networks, virtual networks, virtual servers, virtual devices, Cloud infrastructure, or third party IaaS, PaaS and SaaS Platforms. A network-administrated activity may be network activity, email activity, or other application activity. Further, the collation module may be divided into an email module and a network module. The collation module monitoring network entity activity may feed collected data to a coordinator module to correlate causal links between these activities to supply this input into the cyber threat module. The collation module performs i) passive ingestion of input data as well as ii) potentially active collection of input data and iii) also collates connection content for the other modules.

The cyber threat module may also use one or more machine-learning models trained on cyber threats in the network. The cyber threat module may reference the models that are trained on the normal behavior of user activity and network activity associated with the network. The cyber threat module can reference these various trained machine-learning models and data from the collation module and the trigger module. The cyber threat module can determine a threat risk parameter that factors in how the chain of unusual behaviors correlate to potential cyber threats and 'what is a likelihood of this chain of one or more unusual behaviors of the network activity and user activity under analysis that fall outside of being a normal benign behavior;' and thus, is malicious behavior.

The one or more machine learning models can be self-learning models using unsupervised learning and trained on a normal behavior of different aspects of the system, for example, device activity and user activity associated with a network host, such as a website. The self-learning models of normal behavior are regularly updated. The self-learning model of normal behavior is updated when new input data is received that is deemed within the limits of normal behavior. A normal behavior threshold is used by the model as a moving benchmark of parameters that correspond to a normal pattern of life for the computing system. The normal behavior threshold is varied according to the updated changes in the computer system allowing the model to spot behavior on the computing system that falls outside the parameters set by the moving benchmark.

The comparison module can compare the analyzed metrics on the user activity and network activity compared to their respective moving benchmark of parameters that correspond to the normal pattern of life for the computing system used by the self-learning machine-learning models and the corresponding potential cyber threats.

The comparison module is configured to execute a comparison of input data to at least one machine-learning model to spot behavior on the network deviating from a normal benign behavior of that network entity. The comparison module receives the combined data set from the coordinator module. The at least one machine-learning model is trained on a normal benign behavior of a network entity. The at least one machine uses a normal behavior benchmark describing parameters corresponding to a normal pattern of activity for that network entity. The comparison module can use the comparison to identify whether the network entity is in a breach state of the normal behavior benchmark.

The comparison module can be integrated with the cyber threat module. The cyber threat defense system 100 may also include one or more machine-learning models trained on gaining an understanding of a plurality of characteristics on a transmission and related data including classifying the properties of the transmission and its meta data. The cyber threat module can then determine, in accordance with the analyzed metrics and the moving benchmark of what is considered normal behavior, a cyber-threat risk parameter indicative of a likelihood of a cyber-threat.

The cyber threat defense system 100 may also include one or more machine learning models trained on gaining an understanding of a plurality of characteristics of a connection event where a network entity interacted with an external host and related data including classifying the properties of the connection event and its meta data.

The cyber threat module can also reference the machine learning models trained on a connection event between a network entity and an external host and related data to determine if an external host connection event or a series of external host connection events under analysis have potentially malicious characteristics. The cyber threat module can also factor this external host connection event characteristics analysis into its determination of the threat risk parameter. The cyber threat module can generate a set of incident data describing an anomalous external host connection event by an entity, here representing a user or a device participating in the network. The cyber threat module can use the incident data to determine whether the anomalous event indicates a breach state representing a malicious incident. The cyber threat module can use the user interface and display module to present the incident data to a user analyst for review, response and/or resolution. Alternately, the cyber threat module can execute an autonomous analyst to use machine learning to determine whether the entity has entered a breach state.

Alternately, the cyber threat module can execute an autonomous analyst to use machine-learning to determine whether the network entity in the breach state is a cyber threat. The cyber threat module is configured to identify whether the breach state identified by the comparison module and a chain of relevant behavioral parameters deviating from the normal benign behavior of that network entity correspond to a cyber threat.

The cyber threat defense system 100 may use multiple machine learning models. Each machine learning model may be trained on specific aspects of the normal pattern of life for the system such as devices, users, network traffic flow, outputs from one or more cyber security analysis tools analyzing the system, and others. One or more machine learning models may also be trained on characteristics and aspects of all manner of types of cyber threats. One or more machine learning models may also be trained by observing vectors for malicious activity, such as network activity or emails. One or more machine learning models may be trained by observing the connection events between network entities and external hosts, and the characteristics of the external hosts in question.

The cyber threat defense system 100 may supplement the data provided to the users and cyber professionals using a researcher module. The researcher module operates an artificial intelligence (AI) algorithm to assess whether the anomalous network activity has any salient features in common with activity which has previously appeared in other published threat research, whether internal or external, international security community platforms, or known lists of malicious files or internet addresses. The researcher module can consult internal threat databases or external public sources of threat data. The researcher module can collect an outside data set describing at least one of an action or a state related to the cyber threat present outside of the network from at least one data source outside the network. The researcher module is configured to assess the validity of the threat intelligence derived from the intelligent resources through a machine learning modelling of the value of the data and assign a confidence weighting to the external host information gathered from the intelligent resources. The confidence weighting can take into account features such as the internal/external nature of the source, the age of the source, the distance of the source intelligence from the specific external host seen, all assessed by machine learning models to create variable weightings.

The cyber threat defense system 100 can then take actions to counter detected potential cyber threats. The autonomous response module, rather than a human taking an action, can be configured to cause one or more rapid autonomous actions to be taken to contain the cyber threat when the threat risk parameter from the cyber threat module is equal to or above an actionable threshold. The cyber threat module's configured cooperation with the autonomous response module, to cause one or more autonomous actions to be taken to contain the cyber threat, improves computing devices in the email system by limiting an impact of the cyber threat from consuming unauthorized CPU cycles, memory space, and power consumption in the computing devices via responding to the cyber threat without waiting for some human intervention.

The cyber threat defense system can collect data from a set of external third-party sources to accurately assess network hosts accessed by a network entity. A network entity represents a user or a network device on a network. The collation module can collect, by passive ingestion of a cyber defense appliance situated at some point within the network and one or more optional probes communicating with a distributed network entity, a host identifier identifying an external host accessed by a network entity and the characteristics of the connection event. Upon identifying the host, the cyber threat defense system can have a researcher module configured to collect host research data from an intelligence resource. The host research data describes the external host identified by the collation module. The intelligence resource is a data source not affiliated with the main network. The researcher module is configured to periodically refresh this host research data to maintain up to date content regarding the external host.

The cyber threat defense system can have a host module configured to determine one or more host metrics using one or more machine learning models. The host module can train the one or more machine learning models on a normal benign connection behavior between an external host and a network entity to spot behavior deviating from the normal benign external host connection behavior. The machine learning model uses a normal host behavior benchmark. The normal host behavior benchmark describing parameters corresponding to a normal pattern of activity for a communication between a network entity and an external host, and the 'normal' characteristics of observed external hosts derived by the collation module. Further, the host module is configured to associate a connection entity data set with the host identifier and derive a network entity alias for the network entity from observed behavior across the network. An entity data set describes the characteristics of at least one interaction between the network entity and the external host. A network alias describes the possible derived role of the network entity in the network, such as a Server or a Desktop, as identified by the cyber threat defense system from behavioral markers.

The cyber threat defense system can have a scoring module configured to analyze the host research data from the researcher module in collaboration with the host metrics from the host module. The scoring module may take into account the confidence weightings created by the researcher module and attributed to the host research data when performing an analysis. The scoring module is configured to generate an automatic threat score describing an autonomously-determined threat level presented by the external host based on at least the host research data. The scoring module can factor the connection entity data set into calculation of the automatic threat score as an indicator of network-wide and peer-wide interaction with the external host. The automatic threat score may be generated based upon only the host research data and a machine learned clustering of similarly characterized external hosts, before a network entity is even seen interacting with the host. The scoring module is configured to update the automatic threat score based on at least one analyst threat score describing an analyst-determined threat level. The scoring module is configured to update the automatic threat score based on periodically updated data from the researcher module.

Once the scoring module calculates an automatic threat score, the cyber threat defense system has a user interface module to present that score to a user analyst. The user interface module is configured to generate a threat-tracking graphical user interface to present to the user analyst in a display. The user interface module is configured to present input data in the threat-tracking graphical user interface. The input data may list a series of host identifiers representing external hosts visited by the network entity. The user interface module can identify a hover-over input over one of the external host identifiers. A hover-over input is an input received by hovering a cursor over the external host identifier without clicking on the external host identifier. The user interface module is configured to generate a hover-over box in response to the hover-over input. The hover-over box presents the automatic threat score to the user analyst. The user interface module can identify a clickthrough input in relation to the host identifier. A clickthrough input is an input received by a user clicking on the external host identifier. The user interface module is configured to generate a popup box to present the automatic threat score in response to a clickthrough input. The user interface module is configured to operate the popup box.

The popup box can present an anonymized alias for network entity data values such as host name or username, representing the network entity without compromising any personally identifiable information. A system user with sufficient clearance can reveal the true value of the network entity data fields if malicious activity is discovered. The popup box can present the host identifier to indicate the external host being investigated. The popup box can present the host research data the researcher module has collected from an intelligence resource. The popup box can present the automatic threat score describing an autonomously-determined threat level based on the host research data. The popup box can receive an analyst threat score from the user analyst. The analyst threat score describes an analyst-determined threat level. The scoring module can create a combined threat score based on the analyst threat score and the automatic threat score. The popup box can receive an analyst context comment from the user analyst. The analyst context comment explains the reasoning behind the analyst threat score.

Alternately, the popup box can receive an analyst threat score from an autonomous analyst. In the case of an autonomous analyst, an analyst threat score may represent a judgement based on the severity of the breach state where the external host was observed by the autonomous analyst as involved in the cyber threat breach. The scoring module can create a combined threat score based on the autonomous analyst threat score and the automatic threat score. The popup box can receive an analyst context comment from the autonomous analyst. The autonomous analyst context comment may present salient features of the analysis by the autonomous analyst such as filenames, file hashes, and IP addresses involved in the breach. The autonomous analyst context comment may also describe one or more salient features of the breach state observed by the autonomous analyst where the external host was linked to the formation of the breach state, such as IP Addresses or File Hashes.

The popup box can present a prior analyst threat score to the user analyst. The prior analyst threat score describes a prior analyst-determined threat level assigned by a prior user analyst. The prior user analyst may be in a trusted community of the user analyst assigned by the user to prevent both the inclusion of commentary which exposes confidential information to outside individuals and to avoid the inclusion of commentary or scores from unvetted or untrusted individuals with potential ulterior motives. The popup box can present a prior analyst context comment from the prior user analyst. The prior analyst context comment explains the reasoning behind the prior analyst threat score.

The popup box can present a prior analyst address. The prior analyst address represents the prior user analyst. Upon the user analyst selecting the prior analyst address, a communication module can establish a communication channel between the user analyst and the prior user analyst. The communication channel may be a text or email from the current user analyst to allow the user analyst to receive guidance from the prior analyst. Alternately, if the prior user analyst is available, the communication channel may be a chat, a video chat, or telephone call between the current user analyst and the prior user analyst.

The host module is configured to create a host cluster, by grouping previous external hosts sharing similar characteristics to the current external host. The popup box may present a cluster threat score, averaging the automatic threat scores for that host cluster. A host module may place an external host in more than one cluster. The host-based clustering can produce predictions on external hosts before they are observed interacting with network entities based upon a machine learning analysis of their shared characteristics and relationship to known bad external hosts. The scoring module may be configured to periodically update the automatic threat score based upon the change in average automatic threat scores for the host cluster.

Further, the user analyst can enter a threat tag via the popup box. The threat tag describes the type of threat presented by the external host to the network, and can be determined by the user analyst. If an autonomous analyst is executed by the cyber threat appliance, the tag may be selected and assigned by the autonomous analyst after categorizing the observed breach state (such as Ransomware Attack, DNS Sinkhole). The threat tag may also be suggested to a user analyst based upon closely clustered hosts. The host module is configured to group the external host in a host set based on the threat tag. For example, if the user analyst determines that the external host is distributing malware, the user analyst may enter a "malware distributer" tag to be associated with the external host. The popup box may present a tag threat score, averaging the automatic threat scores for hosts associated with that threat tag. The scoring module may update the automatic threat score based upon the automatic threat score or user analyst score for external hosts with the same tags, or based upon a general threat score associated with specific tags (such as Malware Distributor, Botnet).

The host module is configured to suggest external hosts recently seen on the cyber threat appliance which share one or more characteristics, threat tags or are closely clustered with the external host under investigation. The host module may prompt the user analyst to look at the breach state where this similar external host was involved, or investigate whether that previous appearance of a similar host was itself a breach state.

The popup box can present a malignant external host identifier set. The malignant external host identifier set represents external hosts previously accessed by the network entity. The host module can filter the malignant external host identifier set to those external hosts with an automatic threat score in a range specified by the user analyst. The host module can set the range to a default range if no range is entered by the user analyst.

The researcher module, the scoring module, and the host module, or any combination thereof, may be components of a single module.

The autonomous response module is configured to execute at least one autonomous based on the automatic threat score generated by the scoring module. The autonomous response module can alert the user analyst of an external host with an automatic threat score in a specified range. The autonomous response module can preserve these alerts in a graphical user interface until a user analyst is available for review. The autonomous response module can quarantine the external host, removing access by any part of the network. The autonomous response module can limit the privileges in relation to the rest of the network of any network entity exposed to the external host.

The cyber threat defense system 100 may be hosted on a device, on one or more servers, or in its own cyber threat appliance platform.

Figure 2:
FIG. 2 illustrates a block diagram of an embodiment of an example chain of unusual behavior in connection with the rest of the network under analysis.

FIG. 2 illustrates a block diagram of an embodiment of an example chain of unusual behavior for the email(s) in connection with the rest of the network under analysis.

The user interface can display a graph 200 of an example chain of unusual behavior for the email(s) in connection with the rest of the network under analysis.

The network & email module can tie the alerts and events from the email realm to the alerts and events from the network realm.

The cyber threat module cooperates with one or more machine-learning models. The one or more machine-learning models are trained and otherwise configured with mathematical algorithms to infer, for the cyber threat analysis, 'what is possibly happening with the chain of distinct alerts and/or events, which came from the unusual pattern,' and then assign a threat risk associated with that distinct item of the chain of alerts and/or events forming the unusual pattern.

This is 'a behavioral pattern analysis' of what are the unusual behaviors of the network entity, such as a network, a system, a device, a user, or an email, under analysis by the cyber threat module and the machine-learning models. The cyber defense system uses unusual behavior deviating from the normal behavior and then builds a chain of unusual behavior and the causal links between the chain of unusual behavior to detect cyber threats. An example behavioral pattern analysis of what are the unusual behaviors may be as follows. The unusual pattern may be determined by filtering out what activities, events, or alerts that fall within the window of what is the normal pattern of life for that network entity under analysis. Then the pattern of the behavior of the activities, events, or alerts that are left, after the filtering, can be analyzed to determine whether that pattern is indicative of a behavior of a malicious actor, such as a human, a program, an email, or other threat. The defense system can go back and pull in some of the filtered out normal activities to help support or refute a possible hypothesis of whether that pattern is indicative of a behavior of a malicious actor. An example behavioral pattern included in the chain is shown in the graph over a time frame of, an example, 7 days. The defense system detects a chain of anomalous behavior of unusual data transfers three times, unusual characteristics in network actions in the monitored system three times which seem to have some causal link to the unusual data transfers. Likewise, twice unusual credentials tried unusual behavior of trying to access to sensitive areas or malicious IP addresses and the user associated with the unusual credentials trying unusual behavior has a causal link to at least one of those three emails with unusual characteristics. When the behavioral pattern analysis of any individual behavior or of the chain as a group is believed to be indicative of a malicious threat, then a score of how confident the defense system is in this assessment of identifying whether the unusual pattern was caused by a malicious actor is created. Next, also assigned is a threat level parameter (e.g. score or probability) indicative of what level of threat does this malicious actor pose to the system. Lastly, the cyber threat defense system is configurable in its user interface of the defense system on what type of autonomous response actions, if any, the defense system may take when for different types of cyber threats that are equal to or above a configurable level of threat posed by this malicious actor.

The cyber threat module may chain the individual alerts and events that form the unusual pattern into a distinct item for cyber threat analysis of that chain of distinct alerts or events. The cyber threat module may reference the one or more machine-learning models trained on e-mail threats to identify similar characteristics from the individual alerts or events forming the distinct item made up of the chain of alerts or events forming the unusual pattern.

One or more machine-learning models may also be trained on characteristics and aspects of all manner of types of cyber threats to analyze the threat risk associated with the chain or cluster of alerts or events forming the unusual pattern. The machine-learning technology, using advanced mathematics, can detect previously unidentified threats, without relying on prescribed rules, and autonomously defend networks.

The models may perform by the threat detection through a probabilistic change in normal behavior through the application of an unsupervised Bayesian mathematical model to detect behavioral change in computers and computer networks. The core threat detection system is termed the 'Bayesian probabilistic'. The Bayesian probabilistic approach can determine periodicity in multiple time series data and identify changes across single and multiple time series data for the purpose of anomalous behavior detection. From the email and network raw sources of data, a large number of metrics can be derived each producing time series data for the given metric.

The detectors in the cyber threat module including the network module and email module components can be discrete mathematical models that implement a specific mathematical method against different sets of variables with the target. Thus, each model is specifically targeted on the pattern of life of alerts and/or events coming from, for example, i) that cyber security analysis tool, ii) analyzing various aspects of the emails, iii) coming from specific devices and/or users within a system, etc.

At its core, the cyber threat defense system mathematically characterizes what constitutes 'normal' behavior based on the analysis of a large number/set of different measures of a devices network behavior. The cyber threat defense system can build a sophisticated 'pattern of life'—that understands what represents normality for every person, device, email activity, and network activity in the system being protected by the cyber threat defense system.

As discussed, each machine-learning model may be trained on specific aspects of the normal pattern of life for the system such as devices, users, network traffic flow, outputs from one or more cyber security analysis tools analyzing the system, email contact associations for each user, email characteristics, and others. The one or more machine-learning models may use at least unsupervised learning algorithms to establish what is the normal pattern of life for the system. The machine-learning models can train on both i) the historical normal distribution of alerts and events for that system and ii) a normal distribution information from similar peer systems to establish the normal pattern of life of the behavior of alerts or events for that system. Another set of machine-learning models train on characteristics of emails and the activities and behavior of its email users to establish a normal for these.

The models can leverage at least two different approaches to detecting anomalies: such as comparing each system's behavior to its own history and comparing that system to its peers' history or such as comparing an email to both characteristics of emails and the activities and behavior of its email users. This multiple source comparison allows the models to avoid learning existing bad behavior as 'a normal behavior', because compromised entities, such as devices, users, components, emails will exhibit behavior different to their immediate peers.

In addition, the one or more machine-learning models can use the comparison of i) the normal pattern of life for that system corresponding to the historical normal distribution of alerts and events for that system mapped out in the same multiple dimension space to ii) the current chain of individual alerts and events behavior under analysis. This comparison can yield detection of the one or more unusual patterns of behavior within the plotted individual alerts or events, which allows the detection of previously unidentified cyber threats compared to finding cyber threats with merely predefined descriptive objects or signatures. Thus, increasingly intelligent malicious cyber threats, picking and choosing when they take their actions in order to generate low level alerts and event, will still be detected, even though they have not yet been identified by other methods of cyber analysis. These intelligent malicious cyber threats can include malware, spyware, key loggers, malicious links in an email, malicious attachments in an email, and others as well as nefarious internal information technology staff who know intimately how to not set off any high-level alerts or events.

The plotting and comparison are a way to filter out what is normal for that system and then be able to focus the analysis on what is abnormal or unusual for that system. Then for each hypothesis of what could be happening with the chain of unusual events or alerts, the gather module may gather additional metrics from the data store including the pool of metrics originally considered 'weaker indicators of abnormal behavior' to support or refute each possible hypothesis of what could be happening with this chain of unusual behavior under analysis.

Note, each of the individual alerts or events in a chain of alerts or events that form the unusual pattern can indicate subtle abnormal behavior. Thus, each alert or event can have a low threat risk associated with that individual alert or event. However, when analyzed as a distinct chain or grouping of alerts or events behavior forming the chain of unusual pattern by the one or more machine-learning models, that distinct chain of alerts or events can be determined to now have a much higher threat risk than any of the individual and/or events in the chain.

In addition, modern cyber attacks can be of such severity and speed that a human response cannot happen quickly enough. Thanks to these self-learning advances, a machine may uncover these emerging threats and deploy appropriate, real-time responses to fight back against the most serious cyber threats.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine, email, and human activity behaviorally, at and after the point of compromise, in order to predict and catch today's increasingly sophisticated cyber-attack vectors. It is thus possible to computationally establish what is normal, in order to then detect what is abnormal. In addition, the machine-learning constantly revisits assumptions about behavior, using probabilistic mathematics. The cyber threat defense system's unsupervised machine-learning methods do not require training data with pre-defined labels. Instead unsupervised machine-learning methods may identify key patterns and trends in the data, without the need for human input.

The user interface and output module may also project the individual alerts and/or events forming the chain of behavior onto the user interface with at least three-dimensions of i) a horizontal axis of a window of time, ii) a vertical axis of a scale indicative of the threat risk assigned for each alert and/or event in the chain and a third dimension of iii) a different color for the similar characteristics shared among the individual alerts and events forming the distinct item of the chain. The different color may be red, blue, yellow, or others. For gray scale, the user interface may use different shades of gray, black, and white with potentially different hashing patterns. These similarities of events or alerts in the chain may be, for example, alerts or events are coming from same device, same user credentials, same group, same source identifiers, same destination Internet Protocol addresses, same types of data transfers, same type of unusual activity, same type of alerts, same rare connection being made, same type of events, or others, so that a human can visually see what spatially and content-wise is making up a particular chain rather than merely viewing a textual log of data. Note, once the human mind visually sees the projected pattern and corresponding data, then the human can ultimately decide if a cyber threat is posed. Again, the at least three-dimensional projection helps a human synthesize this information more easily. The visualization onto the user interface allows a human to see data that supports or refutes why the cyber threat defense system thinks these aggregated alerts or events could be potentially malicious. Also, instead of generating the simple binary outputs 'malicious' or 'benign,' the cyber threat defense system's mathematical algorithms produce outputs that indicate differing degrees of potential compromise.

Defense System

Figure 3:
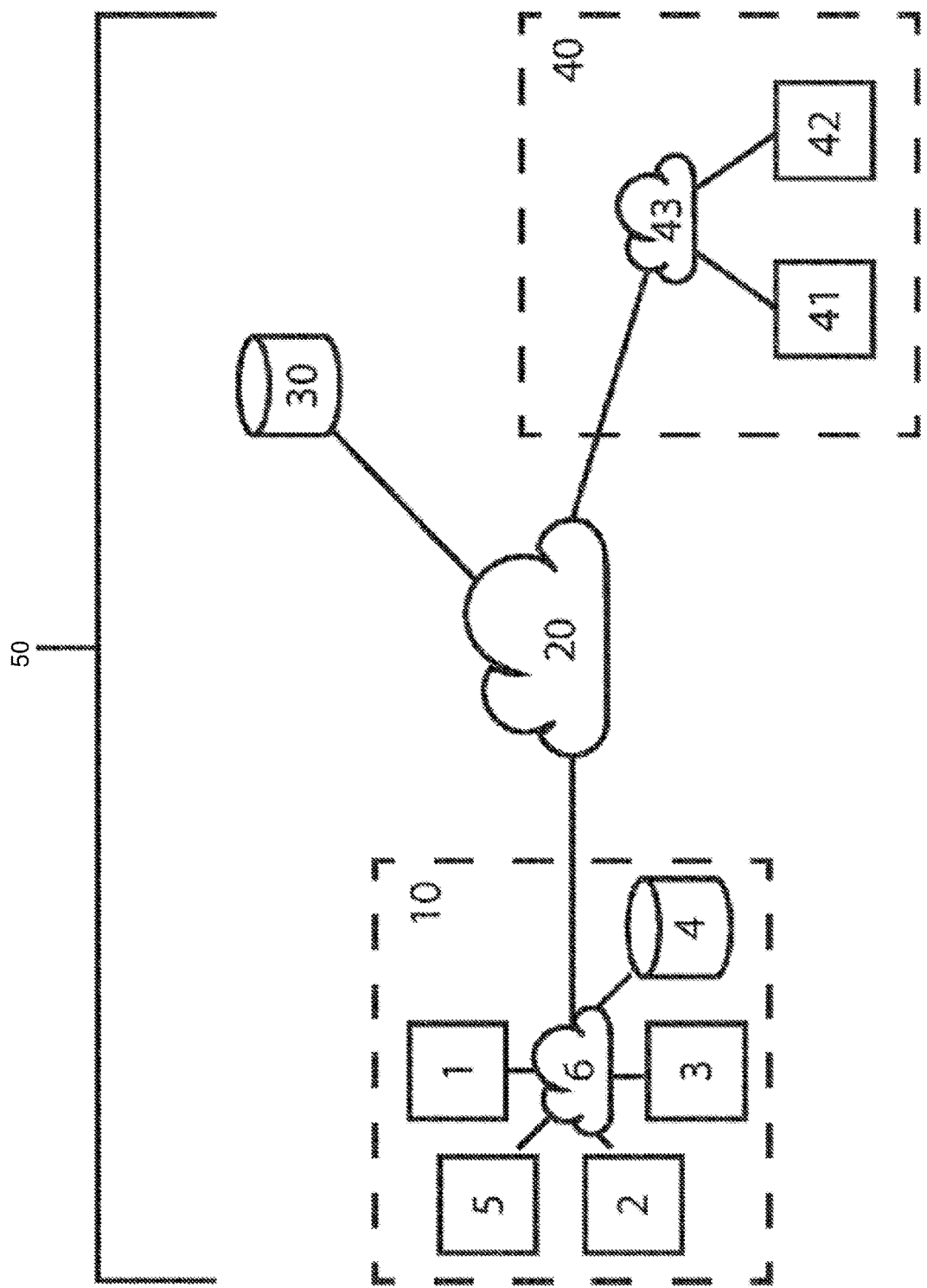
FIG. 3 illustrates a diagram of an embodiment of an example cyber threat defense system protecting an example network.

FIG. 3 illustrates an example cyber threat defense system protecting an example network. The example network FIG. 3 illustrates a network of computer systems 50 using a threat detection system. The system depicted by FIG. 3 is a simplified illustration, which is provided for ease of explanation of the invention. The system 50 comprises a first computer system 10 within a building, which uses the threat detection system to detect and thereby attempt to prevent threats to computing devices within its bounds. The first computer system 10 comprises three computers 1, 2, 3, a local server 4, and a multifunctional device (MFD) 5 that provides printing, scanning and facsimile functionalities to each of the computers 1, 2, 3. All of the devices within the first computer system 10 are communicatively coupled via a local area network (LAN) 6. Consequently, all the computers 1, 2, 3 can access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this exemplary embodiment of the invention, computer 1 on the first computer system 10 has the threat detection system and therefore runs the threat detection method for detecting threats to the first computer system. As such, it comprises a processor arranged to run the steps of the process described herein, memory required to store information related to the running of the process, as well as a network interface for collecting the required information. This method shall now be described in detail with reference to FIG. 3.

The computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network. Computer 2 is active from about 8:30 AM until 6 PM and usually communicates with machines in the company's U.K. office in second computer system 40 between 9.30 AM and midday. The same employee virtually never accesses the employee time sheets, very rarely connects to the company's Atlanta network, and has no dealings in South-East Asia. The threat detection system takes all the information that is available relating to this employee to establish a 'pattern of life' for that person, which is dynamically updated as more information is gathered. The 'normal' model is used as a moving benchmark, allowing the system to spot behavior on a system that seems to fall outside of this normal pattern of life and to flag this behavior as anomalous, requiring further investigation.

The threat detection system is built to deal with the fact that today's attackers are getting stealthier. An attacker may be 'hiding' in a system to ensure that they avoid raising suspicion in an end user, such as by slowing their machine down, using normal software protocol. Any attack process thus stops or 'backs off' autonomously if the mouse or keyboard is used. However, yet more sophisticated attacks try the opposite, hiding in memory under the guise of a normal process and stealing CPU cycles only when the machine is active, to defeat a relatively-simple policing process. These sophisticated attackers look for activity that is not directly associated with the user's input. As an Advanced Persistent Threat (APT) attack typically has very long mission windows of weeks, months, or years, such processor cycles can be stolen so infrequently that they do not impact machine performance. However cloaked and sophisticated the attack is, the attack will always leave a measurable delta, even if extremely slight, in typical machine behavior, between pre and post compromise. This behavioral delta can be observed and acted on with the form of Bayesian mathematical analysis used by the threat detection system installed on the computer 1.

Figure 4:
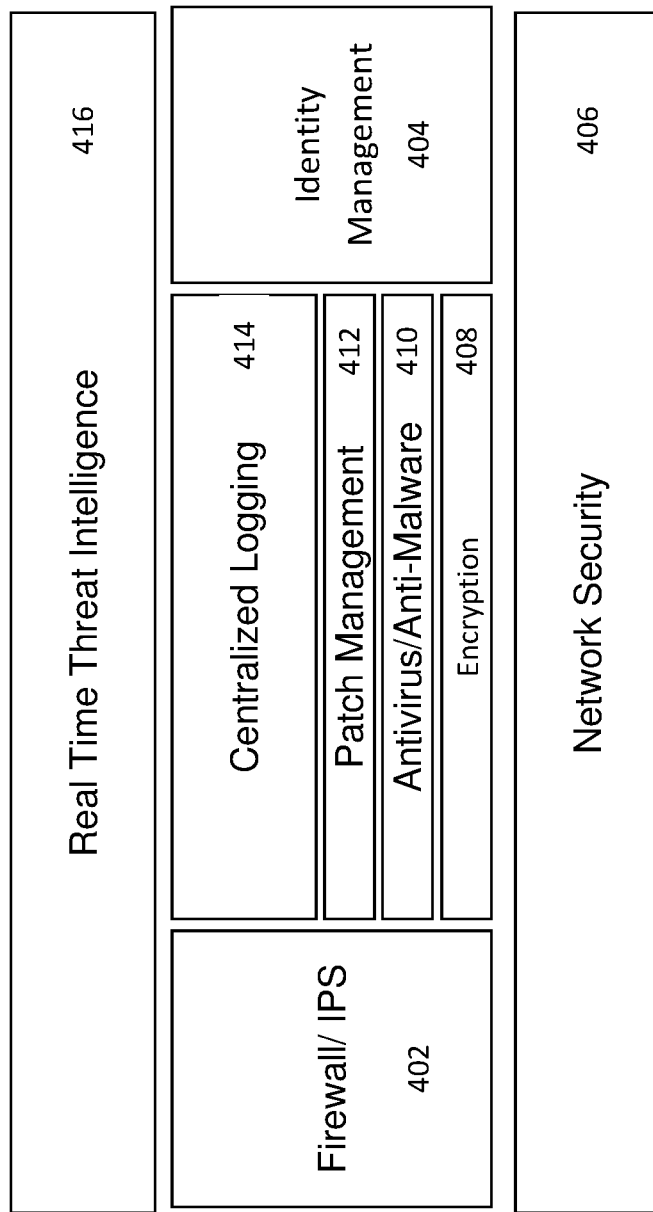
FIG. 4 illustrates in a diagram of an embodiment of the integration of the threat detection system with other network protections.

FIG. 4 illustrates in a block diagram the integration of the threat detection system with other network protections. A network generally has a firewall 402 as a first line of defense. The firewall 402 analyzes packet headers on incoming network data packets to enforce network policy. The firewall 402 may be integrated with an intrusion prevention system (IPS) to analyze the packet header and payload for whole events. Internally, an identity management module 404 controls the access for the users of the network.

A network security module 406 can enforce practices and policies for the network as determined by a network administrator. An encryption module 408 can encrypt communications within the network, as well as encrypting and decrypting communications between network entities and outside entities. An anti-virus or anti-malware module 410 may search packets for known viruses and malware. A patch management module 412 can ensure that security applications within the network have applied the most up-to-date patches. A centralized logging module 414 may track communications both internal to and interactive with the network. The threat detection system can act as real time threat intelligence 416 for the network. The real time threat intelligence may interact with the other defense components to protect the network.

The cyber defense self-learning platform uses machine-learning technology. The machine-learning technology, using advanced mathematics, can detect previously unidentified threats, without rules, and autonomously defend networks. Note, today's attacks can be of such severity and speed that a human response cannot happen quickly enough. Thanks to these self-learning advances, it is now possible for a machine to uncover emerging threats and deploy appropriate, real-time responses to fight back against the most serious cyber threats.

The cyber threat defense system builds a sophisticated 'pattern of life'—that understands what represents normality for every person, device, and network activity in the system being protected by the cyber threat defense system.

The threat detection system may self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. The approach may thus computationally establish what is normal, in order to then detect what is abnormal.

This intelligent system may make value judgments and carry out higher value, more thoughtful tasks. Machine-learning requires complex algorithms to be devised and an overarching framework to interpret the results produced. However, when applied correctly these approaches can facilitate machines to make logical, probability-based decisions and undertake thoughtful tasks.

Advanced machine-learning is at the forefront of the fight against automated and human-driven cyber-threats, overcoming the limitations of rules and signature-based approaches. For example, the machine-learning learns what is normal within a network without depending upon knowledge of previous attacks. The machine-learning thrives on the scale, complexity, and diversity of modern businesses, where every device and person is slightly different. The machine-learning turns the innovation of attackers against them, so that any unusual activity is visible. The machine-learning constantly revisits assumptions about behavior, using probabilistic mathematics. The machine-learning is always up to date and not reliant on human input. Utilizing machine-learning in cyber security technology is difficult, but when correctly implemented it is extremely powerful. The machine-learning means that previously unidentified threats can be detected, even when their manifestations fail to trigger any rule set or signature. Instead, machine-learning allows the system to analyze large sets of data and learn a 'pattern of life' for what it sees.

Figure 5:
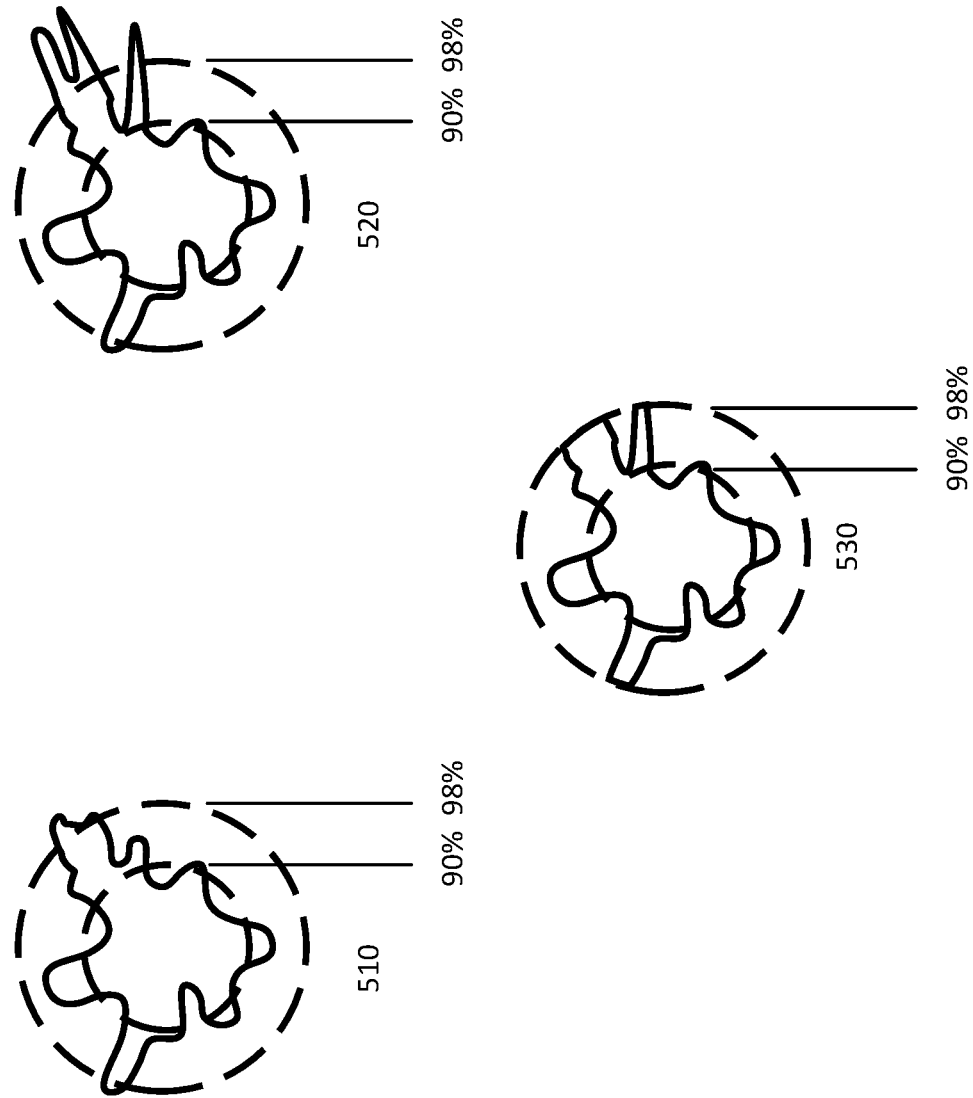
FIG. 5 illustrates a diagram of an embodiment of an application of a cyber threat defense system using advanced machine-learning to detect anomalous behavior.

FIG. 5 illustrates an application of a cyber threat defense system using advanced machine-learning to detect anomalous behavior. A normal pattern of behavior 510 may describe a set of user or device behavior within a threshold level of occurrence, such as a 98% probability of occurrence based on prior behavior. An anomalous activity 520 may describe a set of user or device behavior that is above the threshold level of occurrence. The cyber threat defense system can initiate an autonomous response 530 to counteract the anomalous activity, leaving the normal behavior unaffected.

Machine-learning can approximate some human capabilities to machines. Machine-learning can approximate thought by using past information and insights to form judgments. Machine-learning can act in real time so that the system processes information as it goes. Machine-learning can self-improve by constantly challenging and adapting the model's machine-learning understanding based on new information.

New unsupervised machine-learning therefore allows computers to recognize evolving threats, without prior warning or supervision.

Unsupervised Machine-Learning

Unsupervised learning works things out without pre-defined labels. This allows the system to handle the unexpected and embrace uncertainty. The system does not always know the characteristics of the target of the search but can independently classify data and detect compelling patterns.

The cyber threat defense system's unsupervised machine-learning methods do not require training data with pre-defined labels. Instead, unsupervised machine-learning methods can identify key patterns and trends in the data, without the need for human input. Unsupervised learning provides the advantage of allowing computers to go beyond what their programmers already know and discover previously unknown relationships.

The cyber threat defense system uses unique implementations of unsupervised machine-learning algorithms to analyze network data at scale, intelligently handle the unexpected, and embrace uncertainty. Instead of relying on knowledge of past threats to be able to know what to look for, the cyber threat defense system may independently classify data and detect compelling patterns that define what may be considered to be normal behavior. Any new behaviors that deviate from this notion of 'normality' may indicate threat or compromise. The impact of the cyber threat defense system's unsupervised machine-learning on cyber security is transformative. Threats from within, which would otherwise go undetected, can be spotted, highlighted, contextually prioritized, and isolated using these algorithms. The application of machine-learning has the potential to provide total network visibility and far greater detection levels, ensuring that networks have an internal defense mechanism. Machine-learning has the capability to learn when to execute autonomous responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine-learning is extremely complex and difficult to get right. Robust, dependable algorithms are developed, with a scalability that enables their successful application to real-world environments.

Overview

In an embodiment, the cyber threat defense system's probabilistic approach to cyber security is based on a Bayesian framework. This allows the cyber threat defense system to integrate a huge number of weak indicators of potentially anomalous network behavior to produce a single clear measure of how likely a network device is to be compromised. This probabilistic mathematical approach provides an ability to understand important information amid the noise of the network, even when the target of a search is unknown.

Ranking Threats

Crucially, the cyber threat defense system's approach accounts for the inevitable ambiguities that exist in data, distinguishing between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner, prioritizing those that most urgently require action and simultaneously removing the problem of numerous false positives associated with a rule-based approach.

On a core level, the cyber threat defense system mathematically characterizes what constitutes 'normal' behavior based on the analysis of a large number of different measures of network behavior by a device. Such network behavior may include server access, data access, timings of events, credential use, domain name server (DNS) requests, and other similar parameters. Each measure of network behavior is then monitored in real time to detect anomalous behaviors.

Clustering

To be able to properly model what should be considered as normal for a device, the behavior of the device must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix-based clustering, density based clustering, and hierarchical clustering techniques. The resulting clusters are then used to inform the modeling of the normative behaviors of individual devices. Clustering analyzes behavior in the context of other similar devices on the network. Clustering algorithms identify naturally occurring groupings of devices, which is impossible to do manually. Further, the cyber threat defense system may simultaneously run multiple different clustering methods to inform the models.

The inoculation module may also use clustering to identify which devices to send an inoculation notice. The inoculation module may select devices that have similar characteristics relevant to the anomalous event.

Network Topology

Any cyber threat detection system must also recognize that a network is far more than the sum of its individual parts, with much of its meaning contained in the relationships among its different entities. Plus, any cyber threat defense system must further recognize that complex threats can often induce subtle changes in this network structure. To capture such threats, the cyber threat defense system employs several different mathematical methods in order to be able to model multiple facets of a network topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise local area network (LAN), wide area network (WAN) and Cloud is difficult because both input and output can contain many inter-related features, such as protocols, source and destination machines, log changes, rule triggers, and others. Learning a sparse and consistent structured predictive function is crucial to avoid over fitting.

In this context, the cyber threat defense system has employed a cutting edge large-scale computational approach to learn sparse structure in models of network behavior and connectivity based on applying L1-regularization techniques, such as a Least Absolute Shrinkage and Selection Operator (LASSO) method. This allows for the discovery of true associations between different network components and events that can be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models can constantly adapt themselves, in a computationally efficient manner, as new information becomes available to the system. They continually recalculate threat levels in the light of new evidence, identifying changing attack behaviors where conventional signature-based methods fail.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that can identify subtle variations in machine events within a computer networks behavioral history that may indicate cyber-threat or compromise.

The cyber threat defense system uses mathematical analysis and machine-learning to detect potential threats, allowing the system to stay ahead of evolving risks. The cyber threat defense system approach means that detection no longer depends on an archive of previous attacks. Instead, attacks can be spotted against the background understanding of what represents normality within a network. No pre-definitions are needed, which allows for the best possible insight and defense against today's threats. On top of the detection capability, the cyber threat defense system can create digital antibodies autonomously, as an immediate response to the most threatening cyber breaches. The cyber threat defense system approach both detects and defends against cyber threat. Genuine unsupervised machine-learning eliminates the dependence on signature-based approaches to cyber security, which are not working. The cyber threat defense system's technology can become a vital tool for security teams attempting to understand the scale of their network, observe levels of activity, and detect areas of potential weakness. These no longer need to be manually sought out, but rather are flagged by the automated system and ranked in terms of their significance.

Machine-learning technology is the fundamental ally in the defense of systems from the hackers and insider threats of today, and in formulating response to unknown methods of cyber-attack. It is a momentous step change in cyber security. Defense must start within.

An Example Method

The threat detection system shall now be described in further detail with reference to a flow of the process carried out by the threat detection system for autonomous detection of cyber threats through probabilistic change in normal behavior through the application of an unsupervised Bayesian mathematical model to detect behavioral change in computers and computer networks.

The core threat detection system is termed the 'Bayesian probabilistic'. The Bayesian probabilistic is a Bayesian system of autonomously determining periodicity in multiple time series data and identifying changes across single and multiple time series data for the purpose of anomalous behavior detection.

Figure 6:
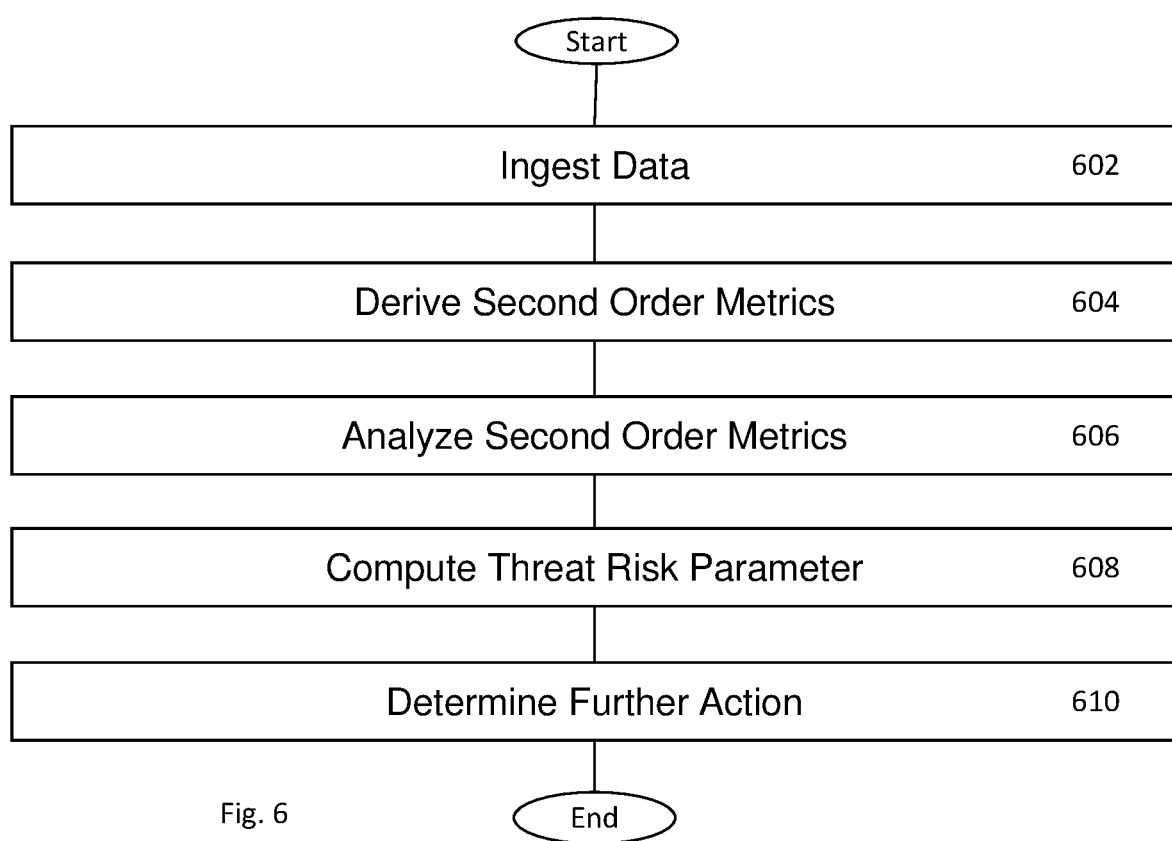
FIG. 6 illustrates a flowchart of an embodiment of a method for modeling human activity, machine activity, or other activity.

FIG. 6 illustrates a flowchart of an embodiment of a method for modeling human, machine or other activity. The cyber threat defense system initially ingests data from multiple sources (Block 602). The raw data sources include, but are not limited to raw network Internet Protocol (IP) traffic captured from an IP or other network Test Access Points (TAP) or Switched Port Analyzer (SPAN) port; machine generated log files; building access ("swipe card") systems; IP or non-IP data flowing over an Industrial Control System (ICS) distributed network; individual machine, peripheral or component power usage; telecommunication signal strength; or machine level performance data taken from on-host sources, such as central processing unit (CPU) usage, memory usage, disk usage, disk free space, network usage, and others.

The cyber threat defense system derives second order metrics from that raw data (Block 604). From these raw sources of data, multiple metrics can be derived, each producing time series data for the given metric. The data are bucketed into individual time slices. For example, the number observed could be counted per 1 second, per 10 seconds or per 60 seconds. These buckets can be combined at a later stage where required to provide longer range values for any multiple of the chosen internal size. For example, if the underlying time slice chosen is 60 seconds long, and thus each metric time series stores a single value for the metric every 60 seconds, then any new time series data of a fixed multiple of 60 seconds (such as 120 seconds, 180 seconds, 600 seconds etc.) can be computed with no loss of accuracy. Metrics are chosen directly and fed to the Bayesian probabilistic by a lower order model which reflects some unique underlying part of the data, and which can be derived from the raw data with particular domain knowledge. The metrics that are obtained depends on the threats that the system is looking for. In order to provide a secure system, the cyber threat defense system commonly obtains multiple metrics relating to a wide range of potential threats. Communications from components in the network contacting known suspect domains.

The actual specific metrics used are largely irrelevant to the Bayesian probabilistic system, as long as a metric is selected. Metrics derived from network traffic could include data such as the number of bytes of data entering or leaving a networked device per time interval, file access, the commonality or rarity of a communications process, an invalid secure-sockets layer (SSL) certification, a failed authorization attempt, or email access patterns.

In the case where transmission control protocol (TCP), user datagram protocol (UDP), or other Transport Layer IP protocols are used over the IP network, and in cases where alternative Internet Layer protocols are used, such as Internet Control Message Protocol (ICMP) or Internet Group Message Protocol (IGMP), knowledge of the structure of the protocol in use and basic packet header analysis can be utilized to generate further metrics. Such further metrics may include the number of multicasts per time interval originating from a networked device and intended to reach publicly addressable IP ranges, the number of internal link-local IP Broadcast requests originating from a networked device, the size of the packet payload data, or the number of individual TCP connections made by a device, or data transferred by a device, either as a combined total across all destinations or to any definable target network range, such as a single target machine or a specific network range.

In the case of IP traffic where the Application Layer protocol can be determined and analyzed, further types of time series metric can be defined. These time series metrics may include, for example, the number of DNS requests a networked device generates per time interval, again either to any definable target network range or in total; the number of Simple Mail Transfer Protocol (SMTP), Post Office Protocol (POP) or Internet Message Access Protocol (IMAP) logins or login failures a machine generates per time interval; the number of Lightweight Directory Access Protocol (LDAP) logins or login failures generated; data transferred via file sharing protocols such as Server Message Block (SMB), SMB2, File Transfer Protocol (FTP), or others; or logins to Microsoft Windows Active Directory, Secure Shell (SSH) or Local Logins to Linux or Unix-like systems, or other authenticated systems such as Kerberos.

The raw data required to obtain these metrics may be collected via a passive fiber or copper connection to the networks internal switch gear, from virtual switching implementations, cloud-based systems, or communicating devices themselves. Ideally, the system receives a copy of every communications packet to provide full coverage of an organization.

For other sources, a number of domain specific time series data are derived, each chosen to reflect a distinct and identifiable facet of the underlying source of the data, which in some way reflects the usage or behavior of that system over time.

Many of these time series data sets are extremely sparse, with most data points equal to 0. Examples would be employee's using swipe cards to access a building or part of a building, or user's logging into their workstation, authenticated by Microsoft Windows Active Directory Server, which is typically performed a small number of times per day. Other time series data sets are much more populated, such as, the size of data moving to or from an always-on Web Server, the Web Servers CPU utilization, or the power usage of a photocopier.

Regardless of the type of data, such time series data sets, whether originally produced as the result of explicit human behavior or an automated computer or other system to exhibit periodicity, have the tendency for various patterns within the data to recur at approximately regular intervals. Furthermore, such data may have many distinct but independent regular time periods apparent within the time series.

Detectors carry out analysis of the second order metrics (Block 606). Detectors are discrete mathematical models that implement a specific mathematical method against different sets of variables with the target network. For example, Hidden Markov Models (HMM) may look specifically at the size and transmission time of packets between nodes. The detectors are provided in a hierarchy that is a loosely arranged pyramid of models. Each detector model effectively acts as a filter and passes its output to another model higher up the pyramid. At the top of the pyramid is the Bayesian probabilistic that is the ultimate threat decision making model. Lower order detectors each monitor different global attributes or 'features' of the underlying network and or computers. These attributes may be value over time for all internal computational features such as packet velocity and morphology, endpoint file system values, and TCP/IP protocol timing and events. Each detector is specialized to record and make decisions on different environmental factors based on the detectors own internal mathematical model such as an HMM.

While the threat detection system may be arranged to look for any possible threat, in practice the system may keep watch for one or more specific threats depending on the network in which the threat detection system is being used. For example, the threat detection system provides a way for known features of the network such as desired compliance and Human Resource policies to be encapsulated in explicitly defined heuristics or detectors that can trigger when in concert with set or moving thresholds of probability abnormality coming from the probability determination output. The heuristics are constructed using complex chains of weighted logical expressions manifested as regular expressions with atomic objects that are derived at run time from the output of data measuring/tokenizing detectors and local contextual information. These chains of logical expression are then stored in online libraries and parsed in real-time against output from the measures/tokenizing detectors. An example policy could take the form of "alert me if any employee subject to HR disciplinary circumstances (contextual information) is accessing sensitive information (heuristic definition) in a manner that is anomalous when compared to previous behavior (Bayesian probabilistic output)". In other words, different arrays of pyramids of detectors are provided for detecting particular types of threats.

The analysis performed by the detectors on the second order metrics then outputs data in a form suitable for use with the model of normal behavior. As will be seen, the data is in a form suitable for comparing with the model of normal behavior and for updating the model of normal behavior.

The threat detection system computes a threat risk parameter indicative of a likelihood of there being a threat using automated adaptive periodicity detection mapped onto observed behavioral pattern-of-life analysis (Block 608). This deduces that a threat over time exists from a collected set of attributes that themselves have shown deviation from normative collective or individual behavior. The automated adaptive periodicity detection uses the period of time the Bayesian probabilistic has computed to be most relevant within the observed network or machines. Furthermore, the pattern of life analysis identifies how a human or machine behaves over time, such as when they typically start and stop work. Since these models are continually adapting themselves autonomously, they are inherently harder to defeat than known systems. The threat risk parameter is a probability of there being a threat in certain arrangements. Alternatively, the threat risk parameter is a value representative of there being a threat, which is compared against one or more thresholds indicative of the likelihood of a threat.

In practice, the step of computing the threat involves comparing current data collected in relation to the user with the model of normal behavior of the user and system being analyzed. The current data collected relates to a period in time, this could be in relation to a certain influx of new data or a specified period of time from a number of seconds to a number of days. In some arrangements, the system is arranged to predict the expected behavior of the system. The expected behavior is then compared with actual behavior in order to determine whether there is a threat.

The system uses machine-learning or Artificial Intelligence to understand what is normal inside a company's network, and when something's not normal. The system then invokes autonomous responses to disrupt the cyber-attack until the human team can catch up. This could include interrupting connections, preventing the sending of malicious emails, preventing file access, preventing communications outside of the organization, etc. The approach begins in as surgical and directed way as possible to interrupt the attack without affecting the normal behavior of, for example, a laptop. If the attack escalates, the cyber threat defense system may ultimately quarantine a device to prevent wider harm to an organization.

In order to improve the accuracy of the system, a check can be carried out in order to compare current behavior of a user with associated users, such as users within a single office. For example, if there is an unexpectedly low level of activity from a user, this may not be due to unusual activity from the user, but rather a factor affecting the office as a whole. Various other factors can be considered in order to assess whether abnormal behavior is actually indicative of a threat.

Finally, the cyber threat defense system determines, based on the threat risk parameter, as to whether further action need be taken regarding the threat (Block 610). A human operator may make this determination after being presented with a probability of there being a threat. Alternately, an algorithm may make the determination, such as by comparing the determined probability with a threshold.

In one arrangement, given the unique global input of the Bayesian probabilistic, a form of threat visualization is provided in which the user can view the threat landscape across all internal traffic and do so without needing to know how their internal network is structured or populated and in such a way as a 'universal' representation is presented in a single pane no matter how large the network. A topology of the network under scrutiny is projected autonomously as a graph based on device communication relationships via an interactive 3D user interface. The projection can scale linearly to any node scale without prior seeding or skeletal definition.

The threat detection system that has been discussed above therefore implements a propriety form of recursive Bayesian estimation to maintain a distribution over the probability state variable. This distribution is built from the complex set of low-level host, network, and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured input/output problems, such as the observation of packet traffic and host activity within a distributed digital enterprise, where both input and output can contain tens of thousands to millions of interrelated features (data transport, host-web-client dialogue, log change and rule trigger, etc.), learning a sparse and consistent structured predictive function is challenged by a lack of normal distribution. To overcome this, the threat detection system comprise a data structure that decides on a rolling continuum rather than a stepwise method in which recurring time cycles, such as the working day, shift patterns, and other routines are dynamically assigned, thus providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

Figure 7:
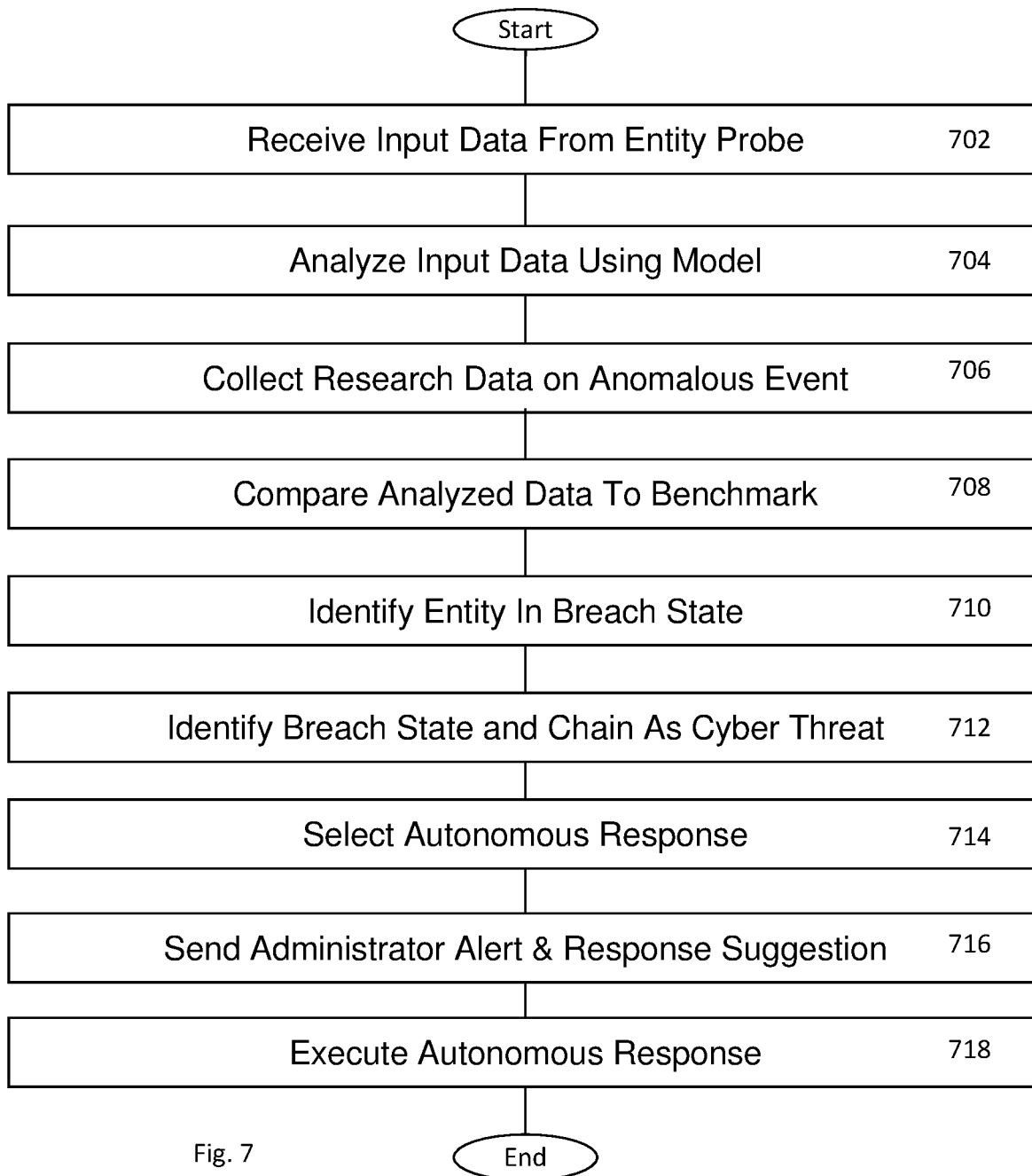
FIG. 7 illustrates a flowchart of an embodiment of a method for identifying a cyber threat.

Once the cyber threat has been identified, the cyber threat defense system can perform an autonomous response. FIG. 7 illustrates a flowchart of an embodiment of a method for developing an inoculation record based on the detection of an anomalous event. The cyber threat defense system can have one or more input ports to connect to one or more networks, and collect input data from i) passive ingestion of network traffic, ii) the one or more optional probes deployed to a distributed network entity such as a third-party Cloud or SaaS Environment, and iii) a cyber defense appliance located on a network and iv) any combination of these three. The input data at least describes network activity from at least one of a user and a network device and usually each user and network device associated with a network.

(Block 702). The network entity can represent at least one of a user and a device associated with a network. The cyber threat defense system has a cyber threat module configured to analyze the input data using at least one machine-learning model to spot behavior on the network deviating from a normal benign behavior of that network entity (Block 704). The at least one machine-learning model is trained on generic normal benign behavior of a generic network entity using a normal behavior benchmark describing parameters corresponding to a normal pattern of activity for that network entity. The cyber threat defense system has a researcher module configured to collect an outside data set describing at least one of an outside action and an outside state related to the input data from at least one data source outside the network (Block 706). The cyber threat defense system has a comparison module that compares the input data to the at least one machine-learning model to spot behavior on the network deviating from a normal benign behavior of that network entity (Block 708). The comparison module can identify whether the network entity is in a breach state of the normal behavior benchmark (Block 710). The cyber threat module can identify whether the breach state and a chain of relevant behavioral parameters deviating from the normal benign behavior of that network entity correspond to a cyber threat (Block 712).

The cyber threat defense system can use an autonomous response module configured to select an autonomous response to take in response to the cyber threat (Block 714). The autonomous response can be, for example, reducing permissions of the network entity or disabling a user account of the network entity. The autonomous response module can send an alert of the cyber threat with a suggested response to the cyber threat to an internal system administrator (Block 716). The autonomous response module can execute the autonomous response in response to the cyber threat (Block 718).

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Researcher

In an embodiment, the cyber threat defense system can have an "automated researcher" artificial intelligence (AI) assistant configured to, in-real-time, anticipate the information needs of a human who is conducting cyber threat investigations. The researcher module 808 uses its artificial intelligence to autonomously draw in useful data from various sources within the platform, within the business, or from across the internet. The cyber threat defense system can then present that data to a user analyst to facilitate the fastest possible decision making by that user analyst. The researcher module 808 can use the machine learning models to anticipatorily pull in content, context and suggest similar hostnames to investigate.

The artificial intelligence researcher assistant assists and streamlines the investigation workflow of a cybersecurity analyst by autonomously anticipating the investigation hypothesis and drawing in relevant content from the platform itself, the organization and external sources such as the internet, removing the need for the analyst to actively consult 3$^{rd}$ party sources outside the investigation platform. The artificial intelligence researcher assistant speeds up human decision-making by anticipating and providing the full picture of a malicious threat, drawing also from a database of previous investigations within an organization enabling knowledge sharing and collaboration across teams.

A researching graphical user interface can be built into a threat-tracking graphical user interface (GUI). The threat-tracking graphical user interface shows potential cyber threat notifications and other data in real time on a two-dimensional or three-dimensional representation of the network being monitored. A user analyst can select a network node on the network representation. The threat-tracking graphical user interface can then present a log of the state of that network node and the actions taken by that network node. The user analyst can then select a state of the network node, an action taken by the network node, an internal network access point accessed by the network node, or an external host accessed by the network node.

The researching graphical user interface integrates a separate window, such as a popup box, into the threat-tracking graphical user interface to pull in additional external information to the system. A user investigating a potential threat can use the researching user interface while still in the threat-tracking graphical user interface. The researcher module 808 can pull in information into that window from, for example, an internet search, a search of an internal knowledge base, a search of users who have prior expertise in the potential threat, and other knowledge sources. The user analyst can use that research data to investigate a potential threat. The user analyst can identify known information about that potential threat while observing the current activities and behaviors of the potential threat in the network on the threat-tracking graphical user interface.

Typically, an analyst investigates and verifies the information about the potential threat on the web or from other sources after the fact in a separate software application on potentially a separate machine. With the researching user interface, the user analyst may view both sources of information side by side in the same user interface and tracked in real time.

Figure 8:
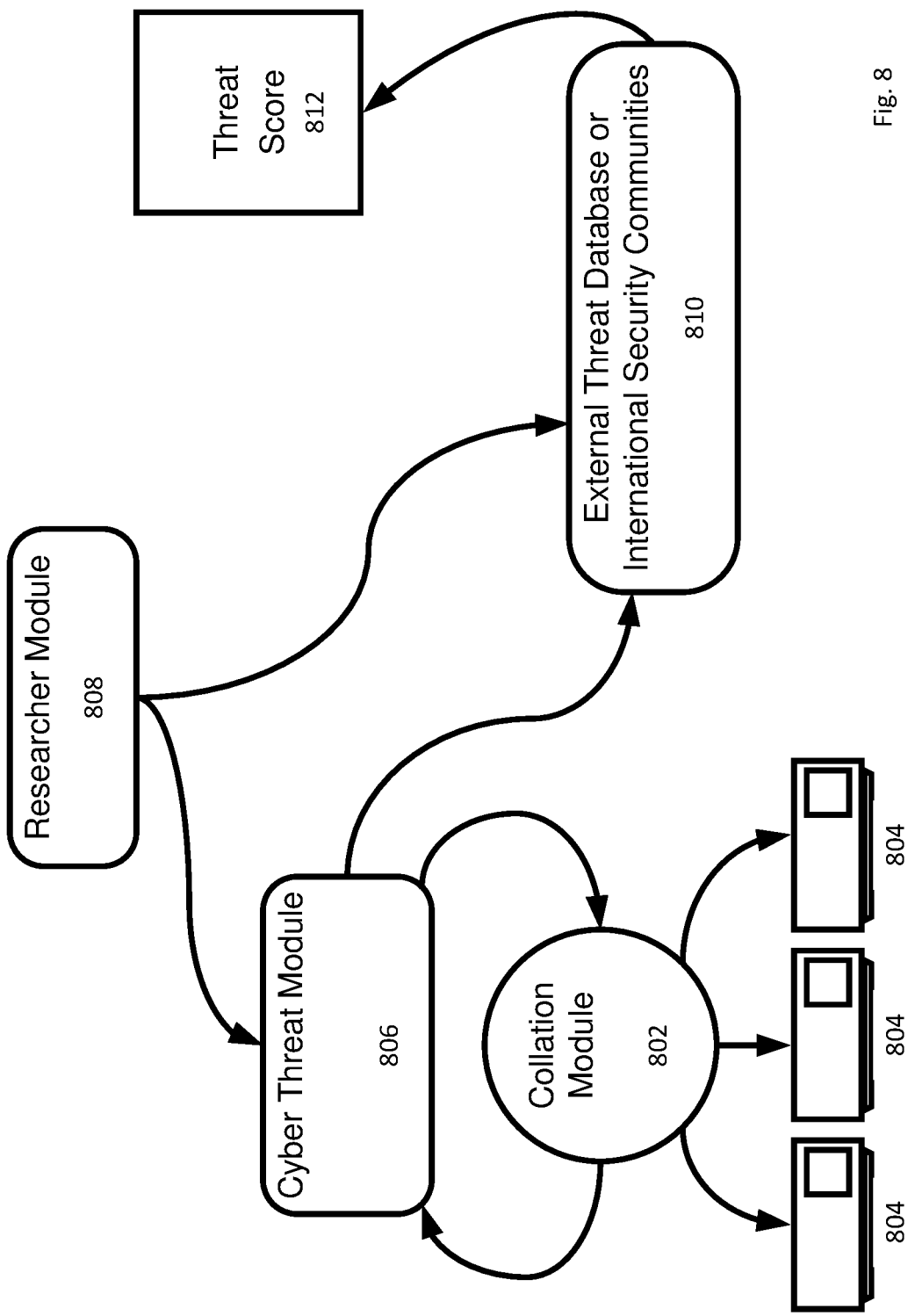
FIG. 8 illustrates a block diagram of an embodiment of a cyber threat defense system integrated with an external researcher module to gather external data on cyber threats.

The researcher module 808 automates the process of gathering threat intelligence from a number of optional external resources and information security communities often consulted by cyber security analysts during their analysis. A scoring module can use machine learning to process the gathered intelligence to predict if a hostname represents an external host that is likely to be malicious. FIG. 8 illustrates a block diagram of an embodiment of a cyber threat defense system integrated with an external researcher module to gather external data on cyber threats. A collation module 802 can collect a set of input data gathered from a cyber appliance situated within a network and an optional series of probes deployed to a set of distributed entities such as SaaS or Cloud environments 804 throughout a network. The input data can represent a series of observed connection, protocol and administrative events, such as state changes for the network entity 804, resource creation or manipulation by the network entity 804, accessing a different network entity 804 by the network entity 804, or accessing an external host via an external network, such as the internet. The collation module 802 can pass this gathered input data to a cyber threat module 806. The cyber threat module 806 can analyze the data to identify cyber threats based on deviations from previously observed normal behavior. The cyber threat module 806 can partially describe the cyber threat based on the gathered input data, as well as including host identifiers, such as hostnames and internet protocol addresses.

The cyber threat module 806 can provide the researcher module 808 with the cyber threat description. The researcher module 808 can optionally search external intelligence resources 810 for intelligence on the cyber threat. An external intelligence resource 810 may be a virus database, an international law enforcement agency, or other repository about data gathered to describe the relative threat level of websites. The researcher module 808 may provide the cyber threat intelligence to a scoring module to generate an automatic threat score 812 to autonomously determine the likelihood that the external host described by the cyber threat intelligence is malicious.

The researcher module 808 can cooperate with one or more machine learning models to analyze i) data being displayed and called up on the threat-tracking graphical user interface, and ii) queries being made by the user analyst on the threat-tracking graphical user interface, in order to analyze what is happening in the network being protected by the cyber-threat coordinator-component and what the user analyst is looking at in order to then anticipatorily go out to internal and external sources to anticipate and assist in finding potentially relevant data to assist in a current investigation, that the machine learning models infer is occurring.

The researcher module 808 cooperates with the one or more machine learning models to autonomously draw into the analyzing additional contextual data detected as associated with i) a particular external host, ii) a connection characteristics observed in a network-entity interaction, iii) via a comment inserted by the user analyst and iv) any combination of these three. The researcher module 808 may draw in the optional contextual data detected as associated with the particular external host and potentially the connection characteristics observed in the network-entity interaction. This optional context could be added as an additional, automated comment in the analyst comment section indicating the source of the additional contextual information. This contextual information may be drawn from internal intelligent resources, including previous breach states observed on the cyber threat appliance, or external intelligent resources, such as international law enforcement or cyber threat intelligence communities. In an example, a particular connection/external host combination has been associated by international law enforcement as associated with criminal group A, or nation state B. This information is derived from the rich text description and drawn into the cyber threat appliance and presented to the user analyst to provide situational awareness and context.

Figure 9:
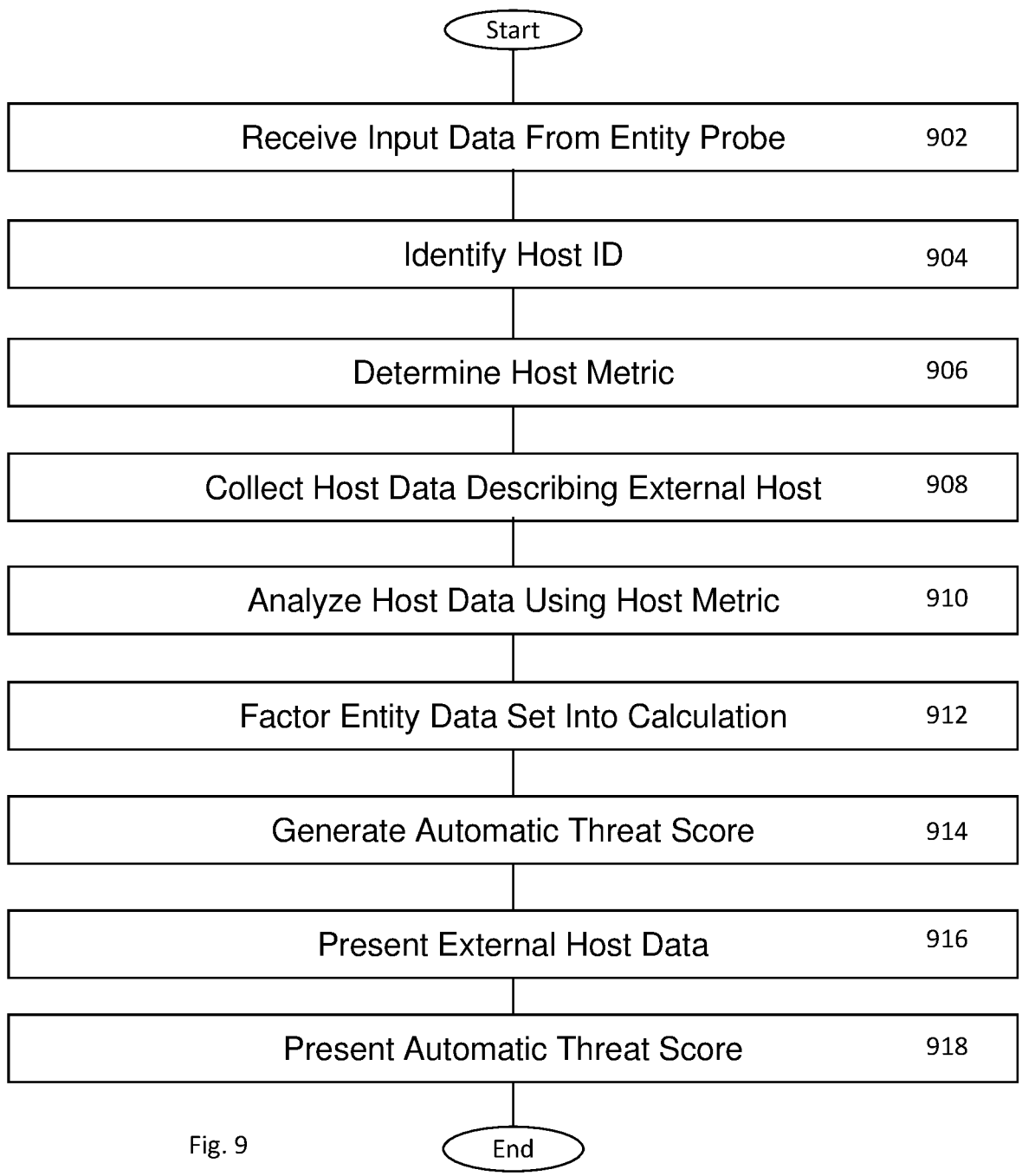
FIG. 9 illustrates a flowchart of an embodiment of a method for generating an automatic threat score.

FIG. 9 illustrates a flowchart of an embodiment of a method for generating an automatic threat score. The cyber threat defense system has a collation module configured to receive input data from at least one probe deployed to a network entity (Block 902). The network entity represents a user or a device associated with a network. The cyber threat defense system has a host module configured to derive a host identifier describing an external host accessed by the network entity in the input data (Block 904). The host module is configured to determine at least one host metric for the external host based on the breach state and the chain of relevant parameters deviating from the normal benign behavior as determined by a cyber threat module (Block 906). The cyber threat defense system has a researcher module configured to collect host research data describing the external host using the at least one host metric (Block 908).

The cyber threat defense system has a scoring module configured to analyze the external host research data from the researcher module in combination with the at least one host metric from the host module (Block 910). The scoring module can be configured to factor an entity data set into a calculation of an automatic threat score if a network entity has already been seen communicating with the external host (Block 912). The entity data set describes at least one interaction between the network entity and the external host. The scoring module is configured to generate an automatic threat score based at least on the host research data using the at least one host metric (Block 914). The automatic threat score describes an autonomously-determined threat level presented by the external host, such as a probability that an external host is a threat to the network entity or the network. The cyber threat defense system has a user interface module configured to present the host research data to the user analyst in a threat-tracking graphical user interface (Block 916). The user interface module is configured to present the input data in a threat-tracking graphical user interface that displays the automatic threat score for the external host to a user analyst (Block 918).

Figure 10:
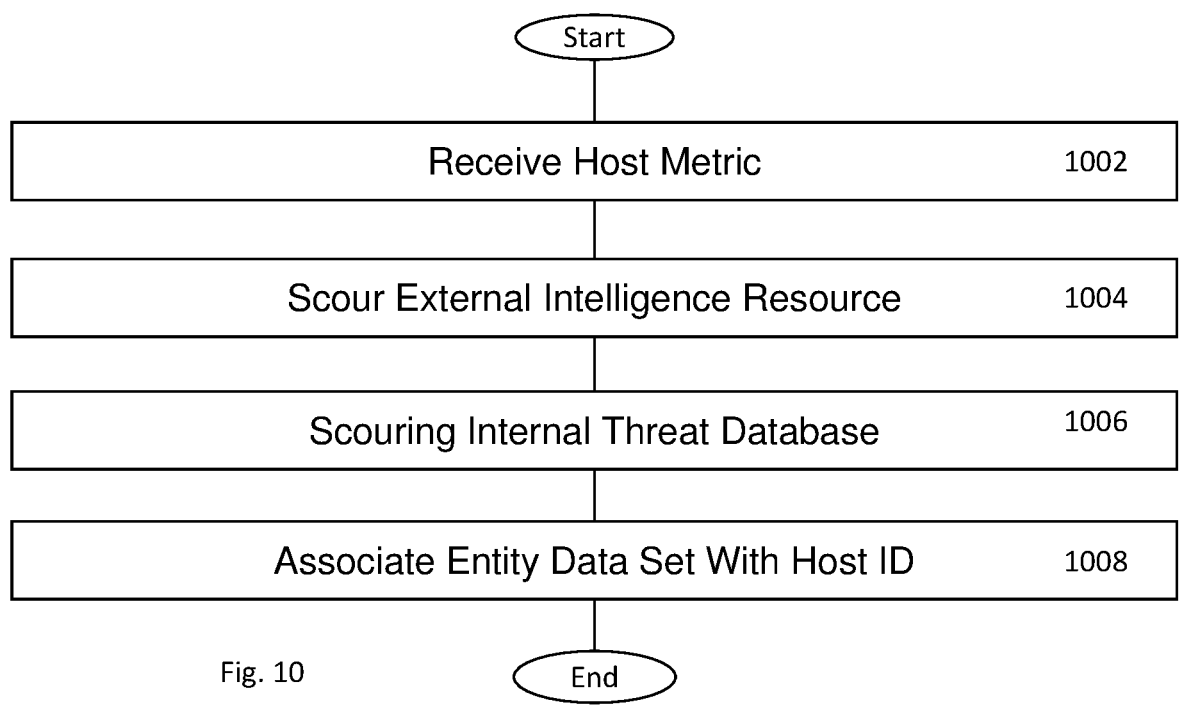
FIG. 10 illustrates a flowchart of an embodiment of a method for collecting host research data.

FIG. 10 illustrates a flowchart of an embodiment of a method for collecting host research data. The cyber threat defense system has a research module configured to receive a host metric formulated by host module (Block 1002). The researcher module is configured to scour an internal threat database within the network for internal host research data about the external host (Block 1004). The researcher module is configured to scour an external intelligence resource outside the network for external host research data about the external host (Block 1006). The research module is configured to associate an entity data set with the host identifier and a network entity alias for the network entity (Block 1008).

Figure 11:
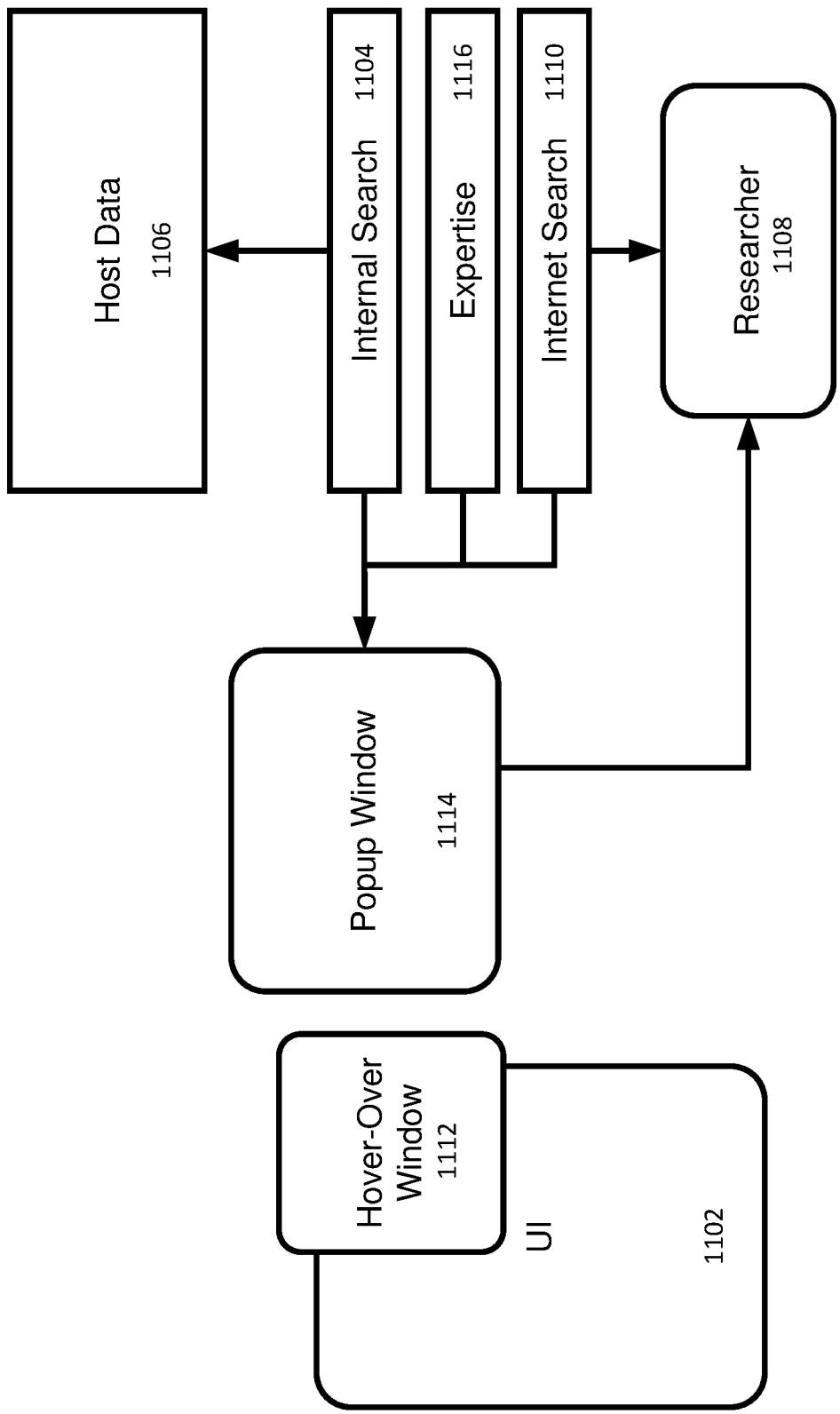
FIG. 11 illustrates a block diagram of an embodiment of a host data presentation system.

FIG. 11 illustrates a block diagram of a host research data presentation system. A threat-tracking graphical user interface 1102 can present a set of input data retrieved from a network entity via a probe. A host module scans the input data to identify any host identifiers. The host module executes an internal search 1104 for any host internal research data 1106 collected in the cyber threat defense system that matches an external host designated by a host identifier in the input data. The host module can provide the host identifiers to a researcher module 1108. The researcher module 1108 executes an internet search 1110 of one or more external intelligence resources to collect host external research data describing the external hosts identified in the input data. A scoring module can then calculate an automatic threat score based on the host external research data and the host internal research data 1106. The host research data may include Domain Name System (DNS) resolution, reverse DNS resolution, rarity, age of the external endpoint, and other host data.

A user analyst can place the cursor in relation to a host identifier in the input data to indicate interest by a hover-over input. The threat-tracking graphical user interface 1102 may generate a hover-over box 1104 in response to the hover-over input. The hover-over box 1112 can display the automatic threat score to the user analyst to provide a quick analysis guide. If the user analyst wants more in-depth information, the user analyst can click on the host identifier for a popup box 1114 to provide a more data rich description. The user analyst can then use the automatic threat score, the host research data, and the acquired expertise 1116 of the user analyst to formulate an analyst threat score. The user analyst can enter the analyst threat score into the popup box 1114. If executing an autonomous analyst, the autonomous analyst may select a threat score based on the severity of a breach state observed by the autonomous analyst where the external host was involved. The autonomous analyst may enter as a comment salient features of the breach state it observed, such as involved IP addresses, file hashes, etc. The scoring module can then combine the automatic threat score and the analyst threat score to create a combined threat score. An autonomous response module can then use the combined threat score to select an autonomous action to counteract any malicious hosts.

Figure 12:
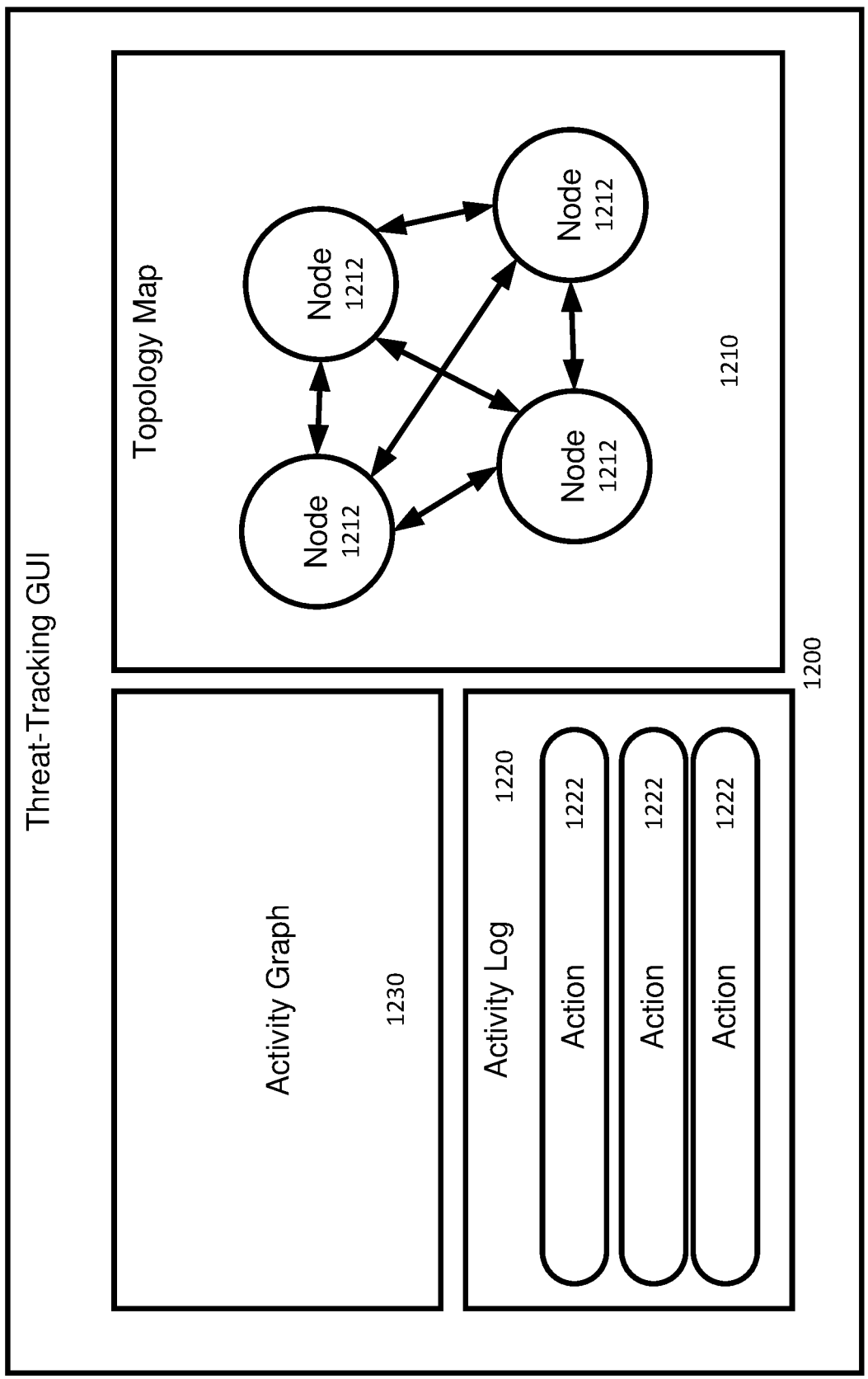
FIG. 12 illustrates a block diagram of an embodiment of a threat-tracking graphical user interface.

FIG. 12 illustrates a block diagram of a threat-tracking graphical user interface 1200. The threat-tracking graphical user interface 1200 may have a topology map 1210 displaying a two-dimensional or three-dimensional representation of the network. The topology map 1210 can have one or more network nodes 1212 acting as a visual avatar for a network entity on the network. The topology map 1210 can illustrate each connection between a network node 1212 and any other network node 1212 in contact with that network node 1212. A network node 1212 can be marked to indicate an issue with the represented network entity. The user analyst can select a network node 1212 with the cursor to reveal more information about the represented network entity.

Upon the selection of a network entity via selection of the network node 1212, the threat-tracking graphical user interface can display an action log 1220 for that network entity. The action log 1220 may list an action line 1222 describing each action by that network entity over a set period. The threat-tracking graphical user interface can use the action log 1220 to generate an activity graph 1230 to show the amount of activity over time. The user analyst can identify problem network entities by identifying spikes in the activity graph. The user analyst can filter the action log 1220 or the activity graph 1230 based on user specified criteria, such as action type, entity type, time period, or threat level, as determined by the automatic threat score.

The threat-tracking graphical user interface 1200 can append an alert to an action line 1222 to indicate an automatic threat score indicating a hazard to the network. The user analyst can hover the cursor over a specific action line 1222 to learn whether that action constitutes a potential threat. For example, by hovering the cursor over an action line 1222 describing the network entity accessing a specific website, the user analyst can learn that the website represents a potential vector for malicious activity. The threat-tracking graphical user interface 1200 can present a hover-over box indicating the level of threat indicated by that specific action. The user analyst can then click on the action line 1222 to learn more about that action to judge the threat level accordingly. The threat-tracking graphical user interface 1200 can then generate a popup box to display contextual data and receive further context from the user analyst.

Figure 13:
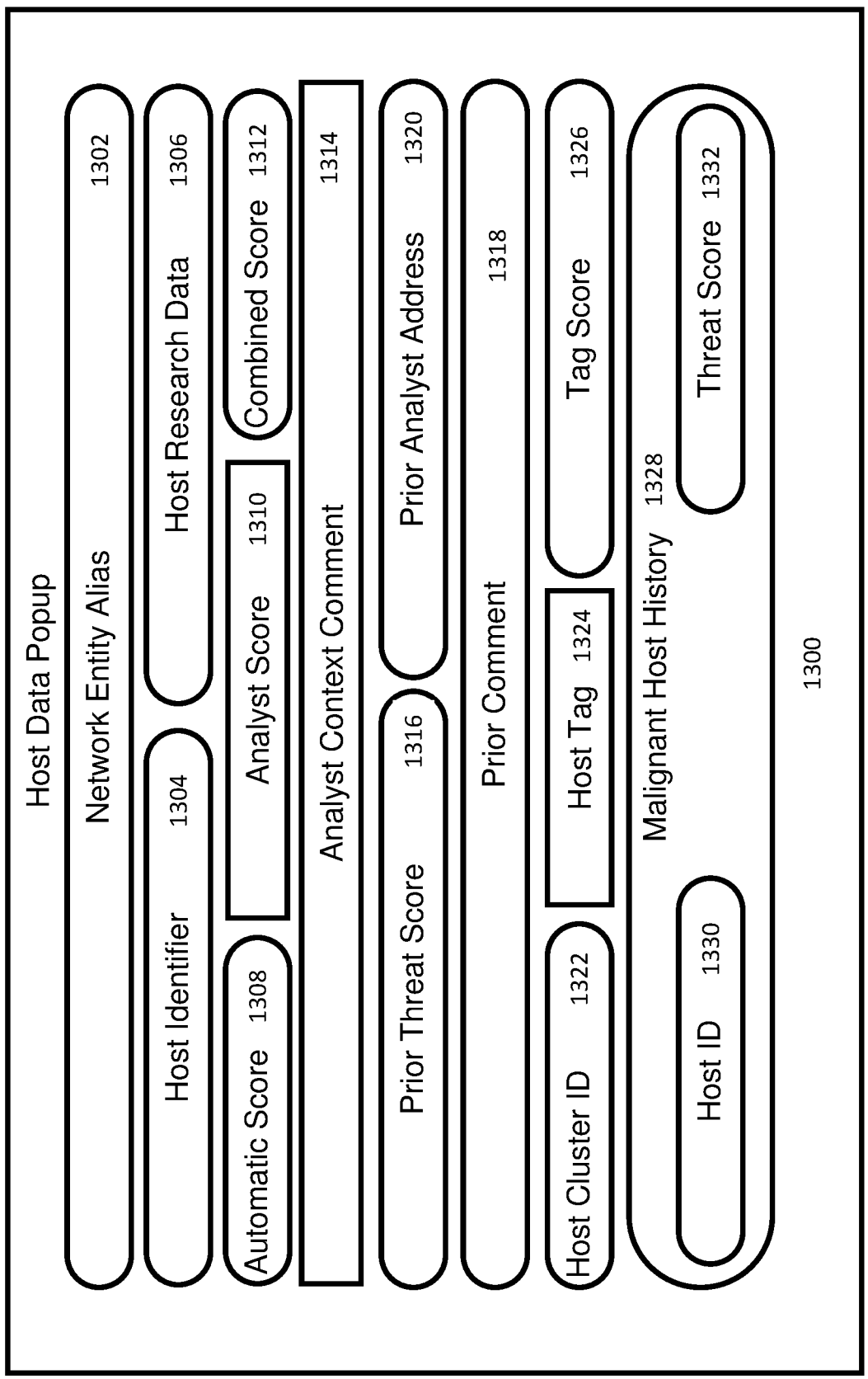
FIG. 13 illustrates a block diagram of an embodiment of a host data popup box.

FIG. 13 illustrates a block diagram of a host data popup box 1300. The host data popup box 1300 can display a network entity alias 1302 referencing the network entity being examined. While the network entity alias 1302 protects the identity of the network entity being examined, a user analyst with a set of high enough administrative privileges can see the actual identity of the network analyst. The network entity alias 1302 can disclose the role of the network entity in the system (such as Server, Client), to assist a user analyst in determining whether the access of a specific external host is related to their position. The host data popup box 1300 can display a host identifier 1304 identifying the host selected by the user analyst. The host data popup box 1300 can display host research data 1306 collected by the researcher module about the selected host.

The host data popup box 1300 can display an automatic threat score generated by the scoring module. The user analyst can review the host research data and the automatic threat score and formulate an independent analyst threat score. The user analyst can then enter the analyst threat score into the analyst threat score input 1310. The scoring module can use the analyst threat score and the automatic threat score to generate a combined threat score. The host data popup box 1300 can then display the combined threat score 1312 to the user analyst. The user analyst can enter an analyst context comment describing factors that lead to the analyst threat score into an analyst context comment input 1314.

If a prior user analyst has already reviewed the external host and provided commentary and a threat score, the host data popup box 1300 can present that information to the user analyst. The host module can limit these prior user analysts to members of a community trusted by the current user analyst, such as coworkers or support staff for the cyber threat defense system. The host data popup box 1300 can display the prior analyst threat score 1316 to the user, along with a prior analyst context comment 1318 explaining the reasoning behind that prior analyst threat score. The host data popup box 1300 can present a prior analyst address 1320 identifying a communication channel to contact the prior user analyst. If the user analyst selects the prior analyst address 1320, a communication module can establish a communication channel between the user analyst and the prior user analyst. For example, if the prior user analyst is not available online, the communication channel can send an email to the prior user analyst requesting an explanation behind the prior user analyst threat score. Alternately, when available, the communication channel can establish a chat or voice session between the user analyst and the prior user analyst.

The host module can cluster the external host with other hosts previously viewed by the network entity that have a profile that matches the external host. Host data popup box 1300 can display a host cluster identifier 1322 categorizing the type of host based on other hosts in the host cluster. If the user analyst selects the host cluster identifier, the user interface module can generate a scroll down list of other hosts in the host cluster. The user analyst can determine a host tag to group the external host with other similar hosts. The user analyst can use the host cluster identifier as a guide when selecting a host tag. The user analyst can then enter the host tag into a host tag input 1324 on the host data popup box 1300. The scoring module can determine a tag threat score by averaging the other combined threat scores for the other external hosts present in the host tag group. The host data popup box 1300 can present the tag threat score 1326 to the user analyst. The user analyst can use the tag threat score as a baseline when determining an analyst threat score for the external host.

The host data popup box 1300 can display a malignant host history 1328 for the network entity to the user analyst. The malignant host history 1328 represents external hosts previously accessed by the network entity that have automatic threat scores in a specified range. The user analyst can adjust the specified range as desired. The malignant host history 1328 can list a malignant host identifier 1330 and a malignant host threat score 1332 for each host in the malignant host history 1328. The user analyst can use the malignant host history 1328 to identify any network entity that has a tendency to access malignant websites.

Figure 14:
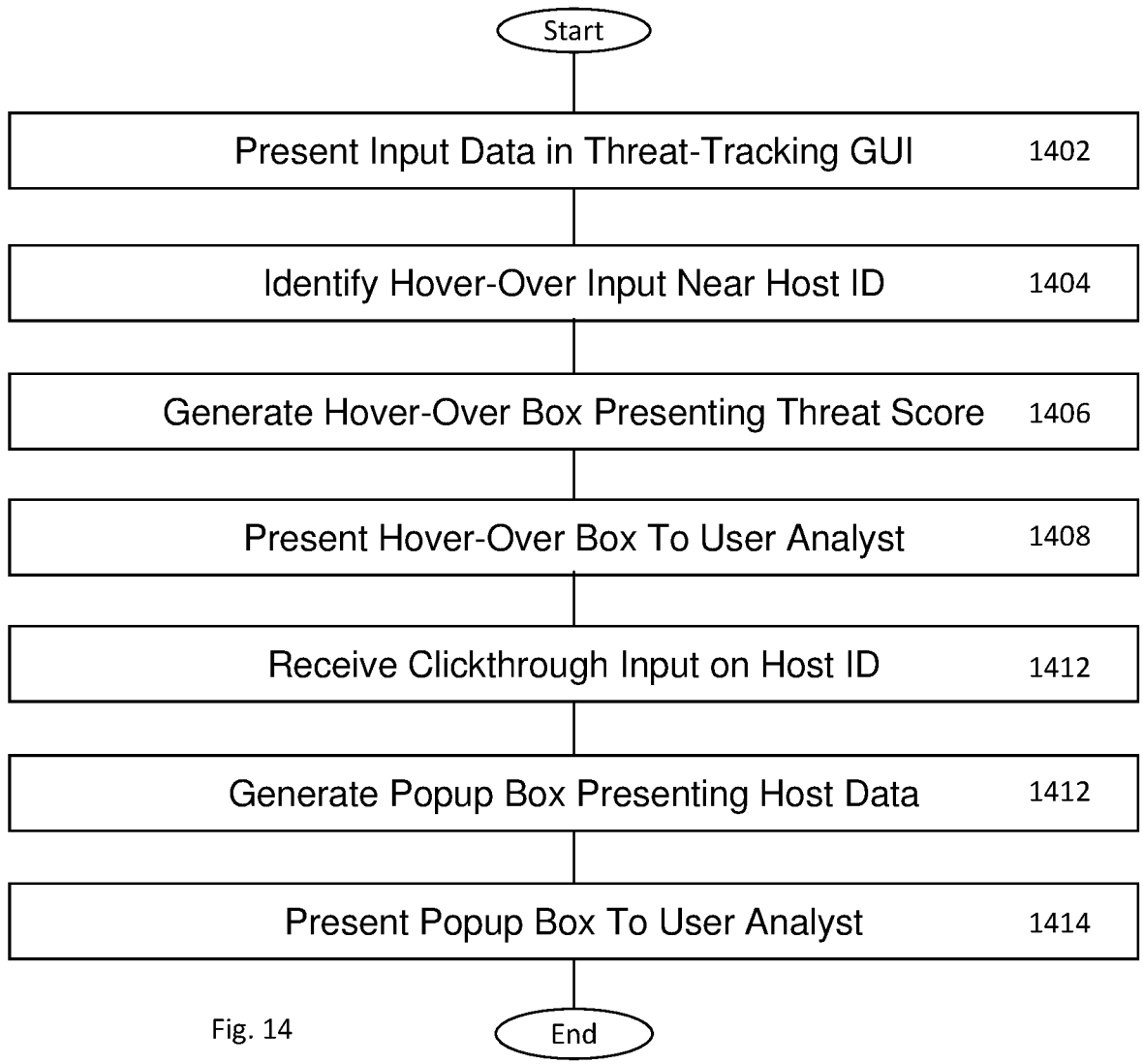
FIG. 14 illustrates a flowchart of an embodiment of a method for generating the host data popup box.

FIG. 14 illustrates a flowchart of an embodiment of a method for generating the host data popup box. The cyber threat defense system has a user interface module configured to present the automatic threat score generated by the scoring module to a user analyst in a threat-tracking graphical user interface (Block 1402). The user interface module is configured to identify a hover-over input in relation to the host identifier (Block 1404). The user interface module is configured to generate a hover-over box to present the automatic threat score in response to a hover-over input in relation to the host identifier (Block 1406). The user interface module is configured to present the hover-over box to a user analyst (Block 1408). The user interface module is configured to receive a clickthrough input in relation to the host identifier (Block 1410). The user interface module is configured to generate a popup box to present the automatic threat score in response to a clickthrough input in relation to the host identifier (Block 1412). The user interface module is configured to present the popup box to a user analyst (Block 1414).

Figure 15:
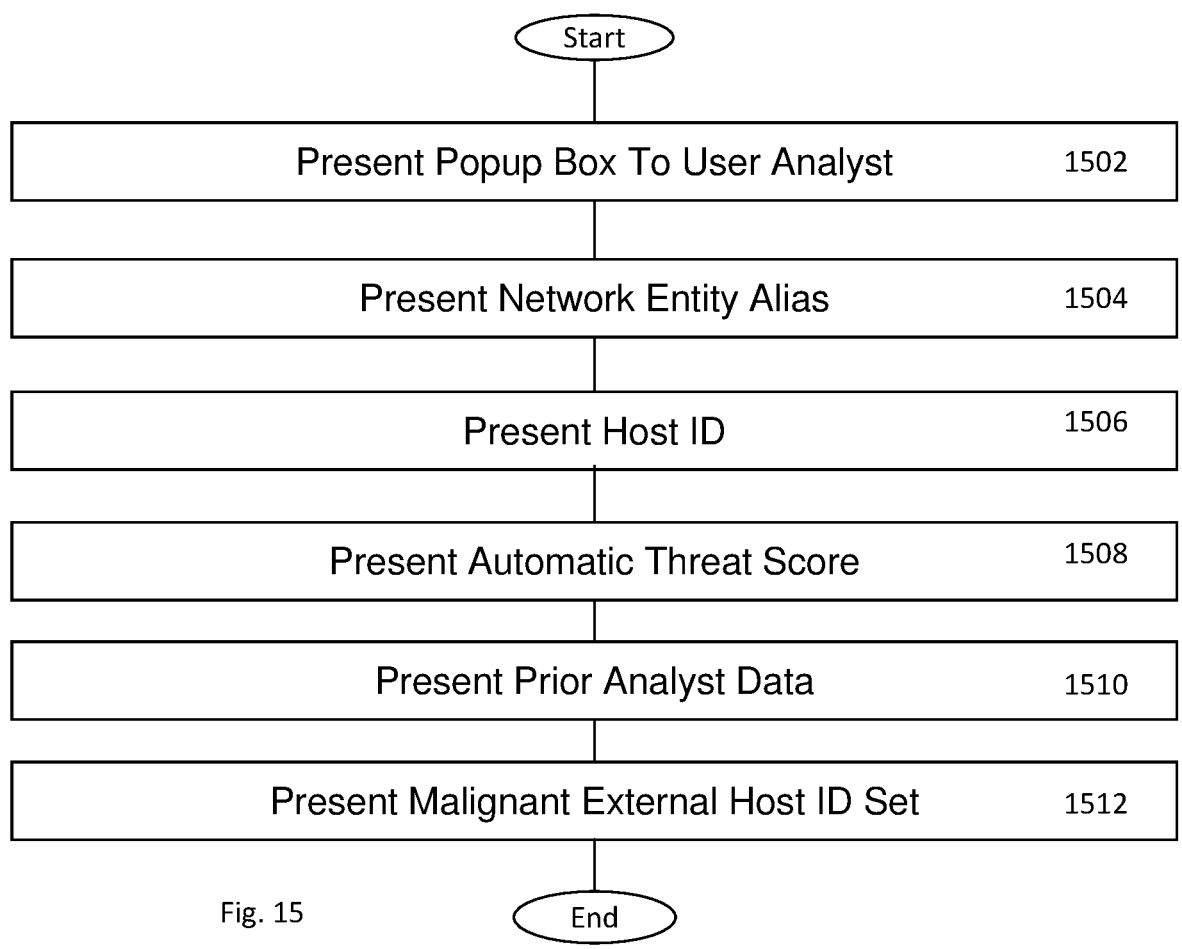
FIG. 15 illustrates a flowchart of an embodiment of a method for presenting the host data.

FIG. 15 illustrates a flowchart of an embodiment of a method for presenting the host data. The user interface module is configured to present the popup box to the user analyst (Block 1502). The user interface module is configured to present the network entity alias to the user analyst (Block 1504). The user interface module is configured to present a host identifier representing an external host to the user analyst (Block 1506). The user interface module is configured to present the automatic threat score to the user analyst (Block 1508). The user interface module is configured to present a prior analyst data set to the user analyst (Block 1510). The user interface module is configured to present a malignant host history representing external hosts previously accessed by the network entity that have automatic threat scores in a specified range (Block 1512).

Figure 16:
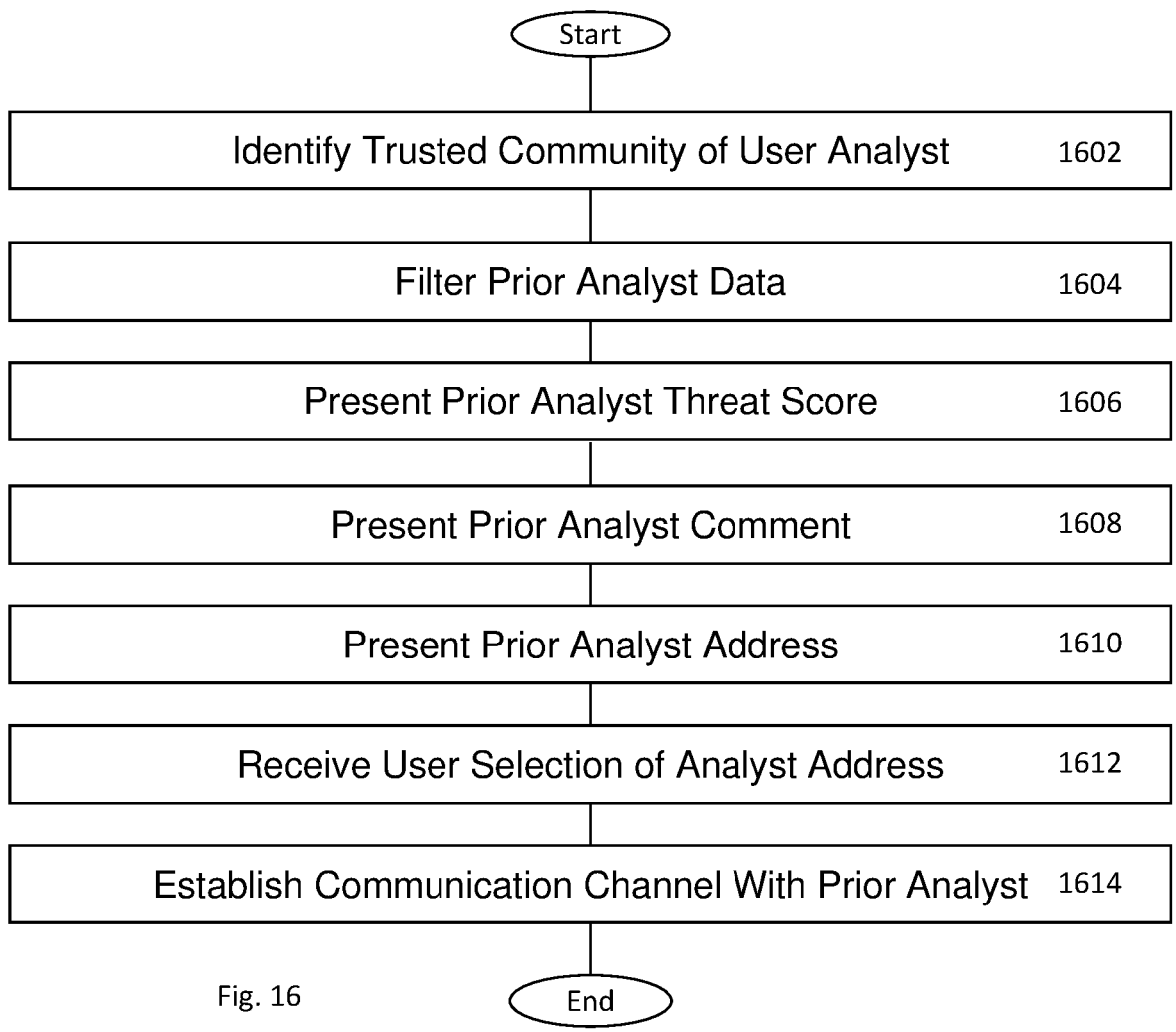
FIG. 16 illustrates a flowchart of an embodiment of a method for presenting prior analysis of host.

FIG. 16 illustrates a flowchart of an embodiment of a method for presenting prior analysis of host. The cyber threat defense system has a host module is configured to identify a trusted community of the user analyst (Block 1602). The host module is configured to filter the prior analyst data to include just the prior user analysts in the trusted community (Block 1604). The user interface module is configured to present a prior analyst threat score describing a prior analyst-determined threat level from a prior user analyst (Block 1606). The user interface module is configured to present a prior analyst context comment explaining the reasoning behind the prior analyst threat score (Block 1608). The user interface module is configured to present a prior analyst address representing the prior user analyst to facilitate establishing a communication channel (Block 1610). The user interface module is configured to receive a user selection of the prior analyst address (Block 1612). The cyber threat defense system has a communication module configured to establish a communication channel with the prior user analyst to discuss the prior analysis of the external host (Block 1614).

Figure 17:
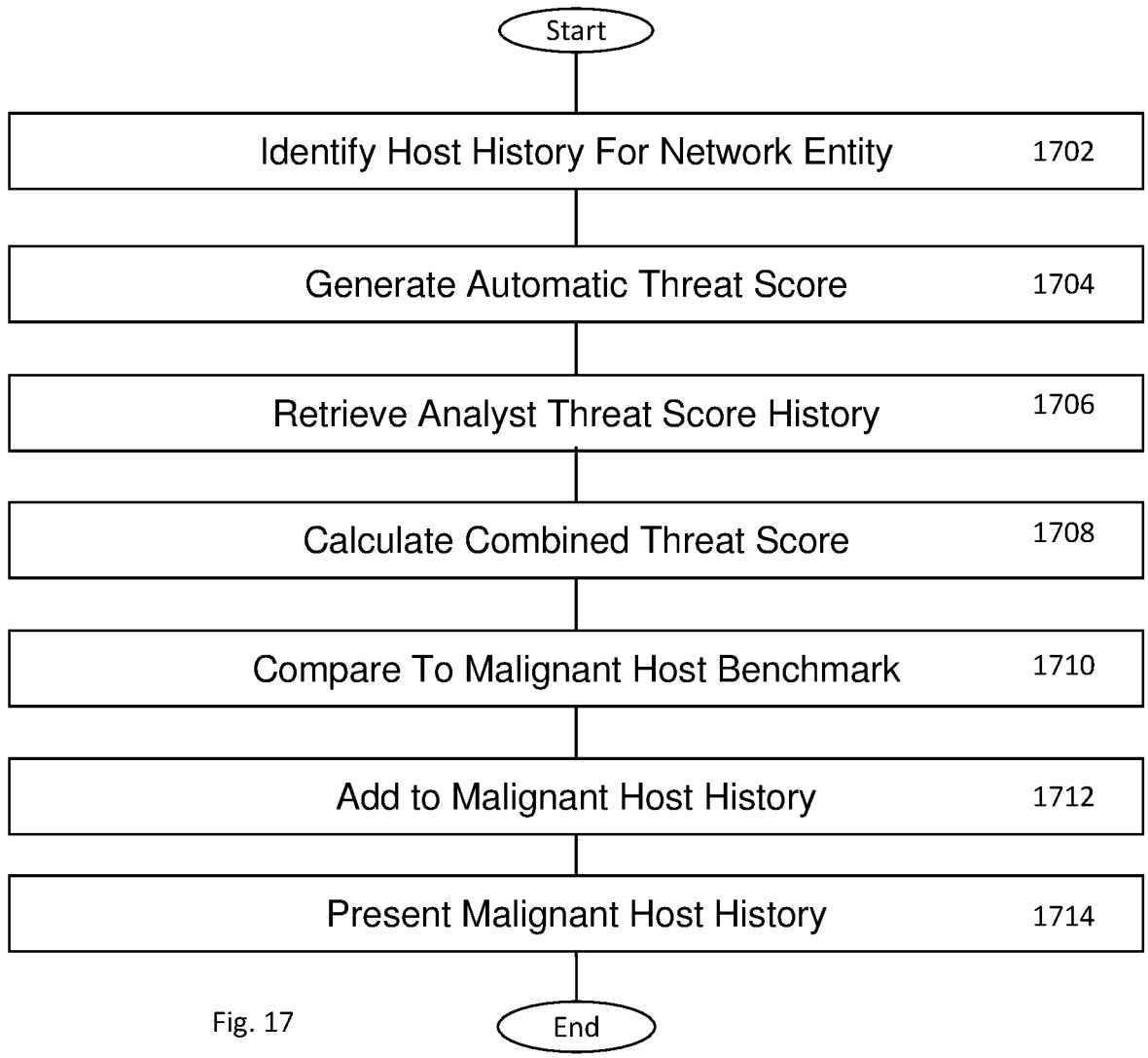
FIG. 17 illustrates a flowchart of an embodiment of a method for presenting other malignant hosts visited by the network entity.

FIG. 17 illustrates a flowchart of an embodiment of a method for presenting other malignant hosts visited by the network entity. The host module is configured to identify a host history describing external hosts previously accessed by the network entity during a specified time period (Block 1702). The scoring module is configured to generate an automatic threat score for each external host in the host history (Block 1704). The scoring module is configured to retrieve an analyst threat score history for each external host in the host history (Block 1706). The scoring module is configured to calculate a combined threat score based on the automatic threat score and the analyst threat score (if present) for each external host in the host history (Block 1708). The host module is configured to compare the combined threat score to a malignant host benchmark, indicating that an external host is malignant (Block 1710). The host module is configured to add the host identifier for the external host to the malignant host history if the combined threat score is in a specified range (Block 1712). The user interface module is configured to present a malignant host history representing external hosts previously accessed by the network entity that have threat scores in a specified range (Block 1714).

Figure 18:
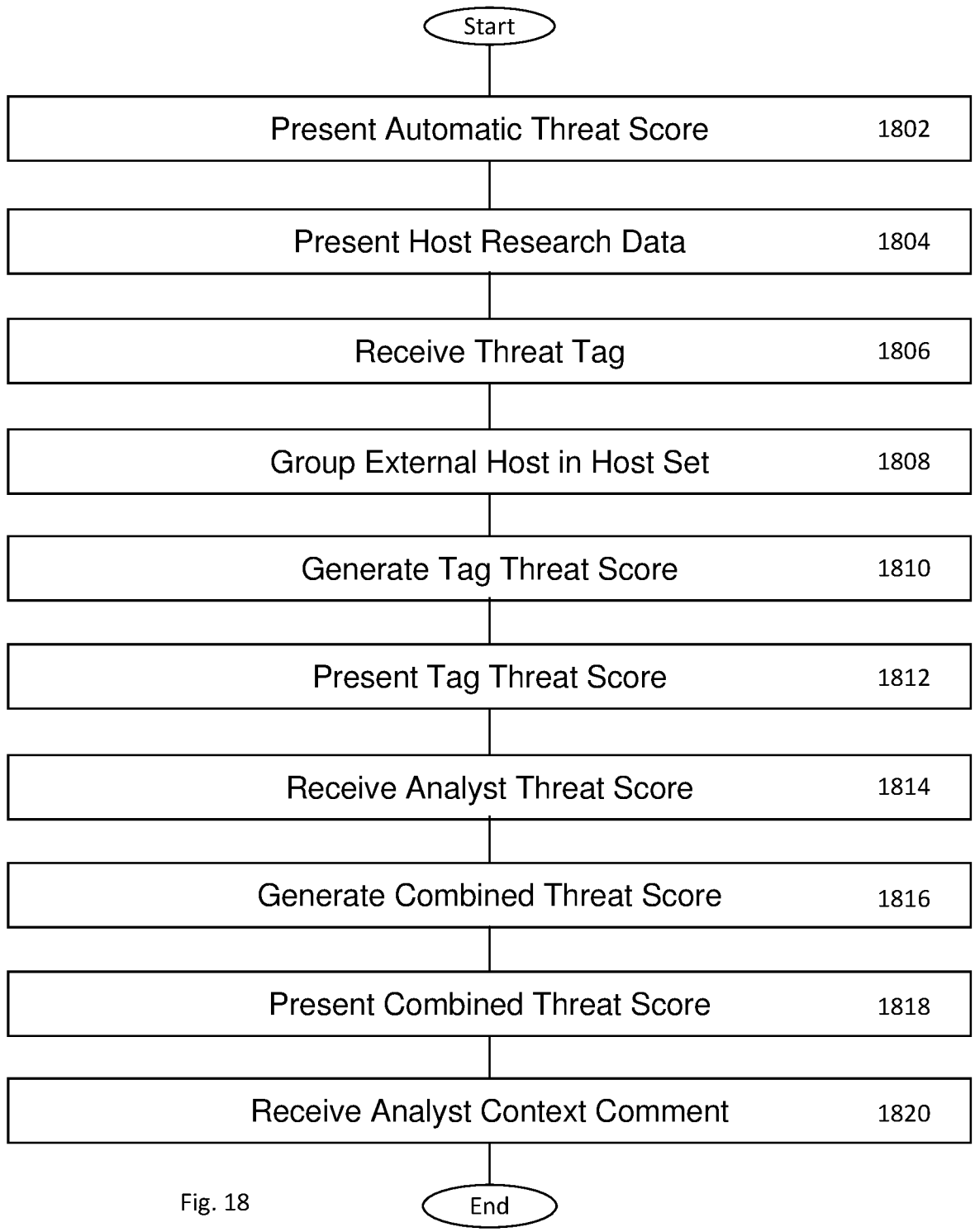
FIG. 18 illustrates a flowchart of an embodiment of a method for generating a combined threat score.

FIG. 18 illustrates a flowchart of an embodiment of a method for generating a combined threat score. The user interface is configured to present the automatic threat score generated by the scoring module to a user analyst in a threat-tracking graphical user interface (Block 1802). The user interface is configured to present the host research data to a user analyst in a threat-tracking graphical user interface (Block 1804). The user interface module is configured to receive a threat tag describing the external host from a user analyst (Block 1806). The host module is configured to group the external host in an external host set based on the threat tag (Block 1808). The scoring module is configured to generate a tag threat score for the external host set (Block 1810). The user interface module is configured to present the tag threat score to the user analyst (Block 1812). The user interface module is configured to receive an analyst threat score describing an analyst-determined threat level from a user analyst (Block 1814). The scoring module is configured to generate a combined threat score based on the automatic threat score and the analyst threat score (Block 1816). The scoring module is configured to present the combined threat score to the user analyst (Block 1818). The user interface module is configured to receive an analyst context comment from the user analyst explaining the analyst threat score from the user analyst (Block 1820).

Figure 19:
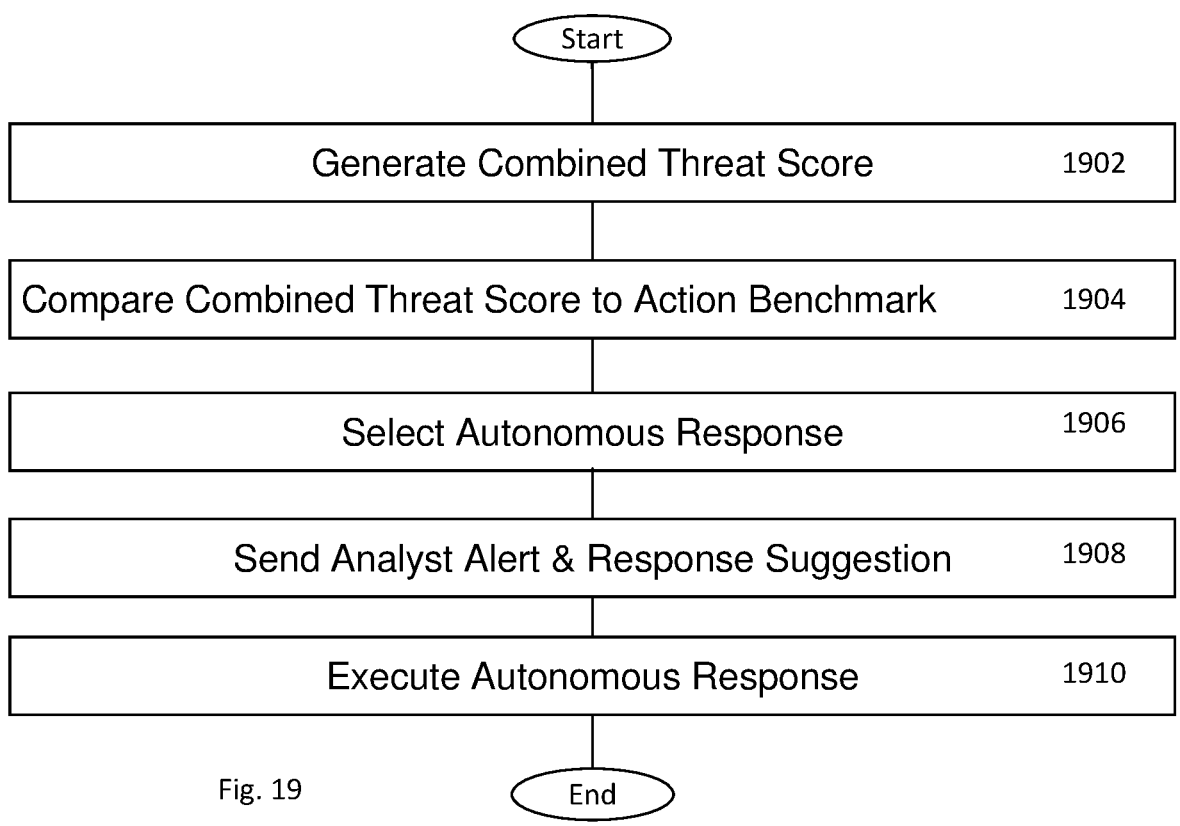
FIG. 19 illustrates a flowchart of an embodiment of a method for executing an autonomous response.

FIG. 19 illustrates a flowchart of an embodiment of a method for executing an autonomous response. The scoring module is configured to generate a combined threat score based on the automatic threat score and the analyst threat score (Block 1902). The cyber threat defense system has an autonomous response module configured to compare the combined threat score to an action benchmark (Block 1904). The autonomous response module is configured to select an autonomous response to the network entity visiting the external host based on the comparison (Block 1906). The cyber threat defense system has a response module configured to send an analysis alert requesting analysis of the external host and a response suggestion of a course of action to the user analyst (Block 1908). The autonomous response module is configured to execute at least one autonomous based on the automatic threat score generated by the scoring module (Block 1910).

Web Site

The web site is configured as a browser-based tool or direct cooperating app tool for configuring, analyzing, and communicating with the cyber threat defense system.

Network

A number of electronic systems and devices can communicate with each other in a network environment. FIG. 20 illustrates in a simplified diagram a networked environment. The network environment has a communications network. The network can include one or more networks selected from an optical network, a cellular network, the Internet, a Local Area Network ("LAN"), a Wide Area Network ("WAN"), a satellite network, a $3^{rd}$ party 'cloud' environment; a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls and similar defenses to protect data integrity.

At least one or more client computing systems for example, a mobile computing device (e.g., smartphone with an Android-based operating system) can communicate with the server(s). The client computing system can include, for example, the software application or the hardware-based system in which may be able exchange communications with the first electric personal transport vehicle, and/or the second electric personal transport vehicle. Each of the one or more client computing systems can have one or more firewalls and similar defenses to protect data integrity.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design can be carried out on a single computing system and/or on a distributed system in which different portions of the present design are carried out on different parts of the distributed computing system.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A method for a cyber threat defense system, comprising:
   receiving input data describing network activity from a cyber defense appliance located on a network representing a network entity comprising at least one of the group consisting of a user and a device associated with the network;
   comparing the input data describing network activity to at least one machine-learning model trained on a normal benign behavior of that network entity using a normal behavior benchmark describing parameters corresponding to a normal pattern of activity for that network entity to spot behavior on the network deviating from the normal benign behavior to identify whether the network entity is in a breach state of the normal behavior benchmark;
   identifying whether the breach state and a chain of relevant behavioral parameters deviating from the normal benign behavior of that network entity correspond to a cyber threat;
   identifying a host identifier describing an external host accessed by the network entity in the input data;
   determining at least one host metric for the external host based on the breach state and the chain of relevant parameters deviating from the normal benign behavior;
   collecting host research data describing the external host using the at least one host metric;
   analyzing the host research data using the at least one host metric;
   generating an automatic threat score describing an autonomously-determined threat level presented by the external host based at least on the host research data using the at least one host metric;
   presenting the input data in a threat-tracking graphical user interface that displays the automatic threat score for the external host to a user analyst; and
   analyzing i) data being displayed and called up on the threat-tracking graphical user interface, and ii) queries being made by the user analyst on the threat-tracking graphical user interface, in order to analyze what is happening in the network being protected by the cyber threat defense system and what the user analyst is looking at in order to then anticipatorily go out to internal and external sources to anticipate and assist in finding potentially relevant data to assist in a current investigation.

2. The method for the cyber threat defense system of claim 1, further comprising:
   scouring an external intelligence resource outside the network for external host research data about the external host.

3. The method for the cyber threat defense system of claim 2, further comprising:
   scouring an internal threat database within the network for internal host research data about the external host, and
   where the input data describing network activity for at least one of the user and the device associated with a network is also received from passive ingestion of network traffic, from one or more probes, and any combination of these two.

4. The method for the cyber threat defense system of claim 1, further comprising:
   factoring an entity data set, describing at least one interaction between the network entity and the external host, into calculation of the automatic threat score, and
   generating a hover-over box to present the automatic threat score in response to a hover-over input in relation to the host identifier.

5. The method for the cyber threat defense system of claim 1, further comprising:
   autonomously drawing into the analyzing additional contextual data detected as associated with i) a particular external host, ii) a connection characteristics observed in a network-entity interaction, iii) via a comment inserted by the user analyst and iv) any combination of these three.

6. The method for the cyber threat defense system of claim 1, further comprising:
   generating a popup box to present the automatic threat score in response to a clickthrough input in relation to the host identifier, and
   presenting the host research data in the popup box.

7. The method for the cyber threat defense system of claim 1, further comprising:
receiving an autonomous analyst threat score describing a severity of the breach state observed by the autonomous analyst where the external host was linked to the formation of the breach state.

8. The method for the cyber threat defense system of claim 7, further comprising:
receiving an autonomous analyst context comment describing one or more salient features of the breach state observed by the autonomous analyst where the external host was linked to the formation of the breach state, such as IP Addresses or File Hashes.

9. A non-transitory computer readable medium comprising computer readable code operable, when executed by one or more processing apparatuses in the computer system to instruct a computing device to perform the method of claim 1.

10. An apparatus for a cyber threat defense system, comprising:
a collation module configured to collect input data describing network activity executed by a network entity, where the network entity includes at least one of a user and a network device using a network;
a comparison module configured to compare the input data from the collation module to at least one machine-learning model trained on a normal benign behavior of that network entity using a normal behavior benchmark describing parameters corresponding to a normal pattern of activity for that network entity to spot behavior on the network deviating from the normal benign behavior to identify whether the network entity is in a breach state of the normal behavior benchmark;
a cyber threat module configured to identify whether the breach state identified by the comparison module and a chain of relevant behavioral parameters deviating from the normal benign behavior of that network entity correspond to a cyber threat;
a host module configured to identify a host identifier identifying an external host accessed by the network entity in the input data from the collation module and to determine at least one host metric based on the breach state and the chain of relevant parameters deviating from the normal benign behavior;
a researcher module configured to collect host research data describing the external host identified by the host module using the at least one host metric from the host module;
a scoring module configured to analyze the host research data from the researcher module using the at least one host metric from the host module and generate an automatic threat score describing an autonomously-determined threat level presented by the external host based on at least the host research data; and
a user interface module configured to present a threat-tracking graphical user interface to a user analyst that displays the automatic threat score generated by the scoring module,
where the researcher module is further configured to cooperate with one or more machine learning models to analyze i) data being displayed and called up on the threat-tracking graphical user interface, and ii) queries being made by the user analyst on the threat-tracking graphical user interface, in order to analyze what is happening in the network being protected by the cyber threat defense system and what the user analyst is looking at in order to then anticipatorily go out to internal and external sources to anticipate and assist in finding potentially relevant data to assist in a current investigation, that the machine learning models infer is occurring.

11. The apparatus for the cyber threat defense system of claim 10, wherein the user interface module is configured to receive a threat tag describing the external host from a user analyst.

12. The apparatus for the cyber threat defense system of claim 11, wherein the host module is configured to group the external host in an external host set based on the threat tag.

13. The apparatus for the cyber threat defense system of claim 10, wherein the user interface module is configured to present a prior analyst threat score describing a prior analyst-determined threat level from a prior user analyst.

14. The apparatus for the cyber threat defense system of claim 10, wherein the researcher module is further configured to cooperate with the one or more machine learning models to autonomously draw into the analyzing additional contextual data detected as associated with i) a particular external host, ii) a connection characteristics observed in a network-entity interaction, iii) via a comment inserted by the user analyst and iv) any combination of these three.

15. The apparatus for the cyber threat defense system of claim 10, wherein the scoring module is configured to combine the automatic threat score with at least one analyst threat score describing an analyst-determined threat level to create a combined threat score.

16. The apparatus for the cyber threat defense system of claim 15, further comprising:
an autonomous response module configured to execute at least one autonomous response to contain a detected cyber threat based on the combined threat score.

17. The apparatus for the cyber threat defense system of claim 10, wherein the user interface module is configured to present a malignant host history representing external hosts previously accessed by the network entity that have threat scores in a specified range.

18. A cyber threat investigative tool, comprising
a collation module configured to collect, from i) passive ingestion of network traffic, ii) one or more probes, and iii) a cyber defense appliance located on a network and iv) any combination of these three, input data describing network activity executed by one or more network entities;
a researcher module configured to cooperate with one or more machine learning models to analyze i) data being displayed and called up on a graphical user interface, and ii) queries being made by a user analyst on the graphical user interface, in order to analyze what is happening in the network being protected by the cyber defense appliance and what the user analyst is looking at in order to then anticipatorily go out to internal and external sources to anticipate and assist in finding potentially relevant data to assist in a current investigation, that the machine learning models infer is occurring; and
a user interface module configured to present the graphical user interface to the user analyst that also displays the potentially relevant data to assist in a current investigation from the researcher module.

* * * * *